United States Patent
Cardno

(10) Patent No.: US 9,355,482 B2
(45) Date of Patent: *May 31, 2016

(54) DIMENSION REDUCING VISUAL REPRESENTATION METHOD

(71) Applicant: NEW BIS SAFE LUXCO S.A R.L, Luxembourg (LU)

(72) Inventor: Andrew John Cardno, San Diego, CA (US)

(73) Assignee: New BIS Safe Luxco S.à r.l, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,811

(22) Filed: Sep. 8, 2014

(65) Prior Publication Data

US 2015/0084964 A1  Mar. 26, 2015

Related U.S. Application Data

(63) Continuation of application No. 13/000,274, filed as application No. PCT/NZ2009/000111 on Jun. 18, 2009, now Pat. No. 8,866,816.

(60) Provisional application No. 61/074,347, filed on Jun. 20, 2008, provisional application No. 61/146,525, filed on Jan. 22, 2009.

(51) Int. Cl.
*G06T 11/20* (2006.01)
*G06Q 10/06* (2012.01)

(52) U.S. Cl.
CPC .............. *G06T 11/206* (2013.01); *G06Q 10/06* (2013.01)

(58) Field of Classification Search
CPC ............ G06T 11/206; G06F 17/30994; G06F 17/30961; G06F 17/18
USPC ......... 345/440, 440.2; 715/243; 707/E17.142
See application file for complete search history.

(56) References Cited

U.S. PATENT DOCUMENTS

| | | | |
|---|---|---|---|
| 6,021,215 | A | 2/2000 | Kornblit et al. |
| 6,088,626 | A | 7/2000 | Lilly et al. |
| RE36,840 | E | 8/2000 | Mihalisin et al. |
| 6,583,794 | B1 | 6/2003 | Wattenberg |
| 7,509,591 | B1 | 3/2009 | Thorn et al. |

(Continued)

FOREIGN PATENT DOCUMENTS

| | | |
|---|---|---|
| GB | 2 352 310 | 1/2001 |
| WO | WO 92/06425 | 4/1992 |

OTHER PUBLICATIONS

Wikipedia; "Heat map;" Date Accessed: Jun. 10, 2008; http://en.wikipedia.org/wiki/Heat_map.

(Continued)

*Primary Examiner* — Gregory J Tryder
*Assistant Examiner* — Scott E Sonners
(74) *Attorney, Agent, or Firm* — Merchant & Gould P.C.

(57) ABSTRACT

In a data visualization system, a method of arranging, in n dimensions, data points representing n or more variables, the method including the steps of: a data point ranking module ranking a set of data points with respect to a first axis of a visual representation using a first variable; and based on a second variable, a data point distribution module distributing the set of data points along the first axis while retaining information relating to the ranking of data points determined in step i).

24 Claims, 23 Drawing Sheets

(56) References Cited

U.S. PATENT DOCUMENTS

2005/0066289 A1* 3/2005 Leah et al. ............... 715/797
2008/0071843 A1 3/2008 Papadimitriou et al.

OTHER PUBLICATIONS

Nasdaq; "Nasdaq-100 Dynamic Heatmap;" Date Accessed: Jun. 10, 2008; http://screening.nasdaq.com/heatmaps/heatmap_100.asp.
Weather.com; Date Accessed: Jan. 31, 2008; http://weather.com/.
Information Aesthetics; "travel time maps;" Date Accessed: Jan. 31, 2008; http://infosthetics.com/archives/locative/.
Few, Stephen; from white paper "BizViz: The Power of Visual Business Intelligence;" Mar. 7, 2006; www.perceptualedge.com.
Wikipedia; "Voronoi Diagram;" Date Accessed: Jan. 31, 2008; http://en.wikipedia.org/wiki/Vorono_diagram.
Entropía; "Mas tiempo;" Date Accessed: Jan. 31, 2008; http://www.luispabon.com/entropia/index.php?entry=entry071129-145959.
Wikipedia; "Agile Software Development;" Date Accessed: Jan. 30, 2008; http://en.wikipedia.org/wiki/Agile_software_development.
Wikipedia; "Dimensional Modeling;" Date Accessed: Apr. 10, 2008; http://en.wikipedia.org/wiki/Dimensional_modeling.
Kimball, Ralph; "A Dimensional Modeling Manifesto;" Date Accessed: Apr. 10, 2008; http://www.dbmsmag.com/9708d15.html.
Sam's Publishing; developer.com Gamelan™; "Introduction to EJB's;" http://www.developer.com/java/ejb/article.php/1434371.
Gilbert, Cheryl, et. al.; SearchCIO—Midmarket; "IIOP;" Date Accessed: Jan. 30, 2008; http://searchcio-midmarket.techtarget.com/sDefinition/0,,sid183_gci214019,00.html.
Google; Google Maps; "KML Gallery: Explore the Earth on Google;" Date Accessed: Jan. 30, 2008; http://earth.google.com/gallery/.
Wikipedia; "Mean down time;" Date Accessed: Jan. 30, 2008; http://en.wikipedia.org/wiki/Mean_down_time.
Wikipedia; "Mean time between failures;" Date Accessed: Jan. 30, 2008; http://en.wikipedia.org/wiki/Mean_time_between_failures.
Wikipedia; "Mean time to recovery;" Date Accessed: Jan. 30, 2008; http://en.wikipedia.org/wiki/Mean_time_to_recovery.
Paris Technologies, Inc.; "OLAP;" Date Accessed: Jan. 30, 2008; http://www.olap.com.
Wikipedia; "Planogram;" Date Accessed: Jan. 30, 2008; http://en.wikipedia.org/wiki/Planogram.
Wikipedia; "Software as a Service;" Date Accessed: Jan. 30, 2008; http://en.wikipedia.org/wiki/Software_as_a_Service.
Wikipedia; "Self-organizing map;" Date Accessed: Jan. 30, 2008; http://en.wikipedia.org/wiki/Self-organizing_map.
Zeiger, Stefan; "Servlet Essentials," Version 1.3.6, Nov. 4, 1999; Date Accessed: Jan. 30, 2008; http://www.novocode.com/doc/servlet-essentials/.
Six Sigma; "Subject Matter Expert—SME;" Date Accessed: Jan. 30, 2008; http://www.isixsigma.com/dictionary/Subject_Matter_Expert_-_SME-396.htm.
IBM; WebSphere Product Pages; "WebSphere software;" Date Accessed: Jan. 30, 2008; http://www-306.ibm.com/software/websphere/?pgel=ibmhzn&cm_re=masthead-_-products-_-sw-websphere.

* cited by examiner

| 00 | 01 | 10 | 11 |
|----|----|----|----|
| 02 | 03 | 12 | 13 |
| 20 | 21 | 30 | 31 |
| 22 | 23 | 32 | 33 |

Figure 9C

| 98,38,99 | 73 |
|----------|-----|
| 50,94,103,40 | 68,81 |

Figure 9D

DIMENSION REDUCING VISUAL REPRESENTATION METHOD

This application is a Continuation of U.S. Ser. No. 13/000,274, filed 29 Mar. 2011, which is a National Stage application of PCT/NZ2009/000111, filed 18 Jun. 2009, which claims benefit of U.S. Provisional Ser. No. 61/074,347, filed 20 Jun. 2008 and U.S. Provisional Ser. No. 61/146,525, filed 22 Jan. 2009 and which applications are incorporated herein by reference. To the extent appropriate, a claim of priority is made to each of the above disclosed applications.

FIELD OF THE INVENTION

The present invention relates to a dimension reducing visual representation method.

BACKGROUND

A chart or graph is described in Wikipedia as a type of information graphic or graphic organizer that represents tabular numeric data and/or functions. Charts are often used to make it easier to understand large quantities of data and the relationship between different parts of the data. Charts can usually be read more quickly than the raw data that they come from. They are used in a wide variety of fields, and can be created by hand (often on graph paper) or by computer using a charting application.

Traditional charts use well established and often poorly implemented ways of representing data. Many tools exist to help the user construct very sophisticated representations of data but that sophistication typically results in less meaningful charts. Embodiments of the present invention aim to overcome this problem.

It is known to use charting wizards such as those that are available in Excel and various other systems such as those provided by, for example, IBM. In addition there are multiple Business Intelligence (BI) tools available to users to enable users to analyze data in an attempt to create meaningful feedback. However, as the amount of data increases, so does the complexity of the visual representations created by the analysis of the data. These complex representations can end up swamping parts of the visual representation that is most required and relevant to an end user, particularly in cases where high dimensional data is visually represented.

Further, the focus of existing known methods of graphically representing data is on providing a single visual design, or type of visual design or visual representation, to represent data. That is, to produce, for example, a single bar graph to be displayed, or a single pie chart to be printed. This is very limiting to a user who may want to show various different aspects of the data in a single document.

Further, due to the inherent problems associated with systems that attempt to visualize high dimensional data and particularly large volumes of high dimensional data, different visualization methods have been suggested to overcome these problems. Most of these methods use latent variables (such as principal component analysis) to reduce the dimensionality of the data to 2 or 3 dimensions before plotting the data. One problem with this approach is that the latent variables sometimes are hard to understand in terms of the original variables and so the user is not able to efficiently analyze the visualized results.

The parallel coordinate (PC) scheme due to Inselberg and others attempts to plot multivariate data in a completely different manner by transforming high dimensional information into a two dimensional representation using a number of parallel lines to represent each dimension. Since plotting more than 3 orthogonal axis is impossible, parallel coordinate schemes plot all the axes parallel to each other in a plane. Squashing the space in this manner does not destroy too much of the geometric structure. The geometric structure is however projected in such a fashion that most geometric intuition has to be relearned, this is a significant drawback, particularly for visualization of business data.

The present invention aims to overcome, or at least alleviate, some or all of the mentioned problems, or to at least provide the public with a useful choice.

SUMMARY OF THE INVENTION

Various concepts are herein disclosed as set out in the claims at the end of the specification.

BRIEF DESCRIPTION OF THE DRAWINGS

Embodiments of the present invention will now be described, by way of example only, with reference to the accompanying drawings, in which:

FIG. 1A shows a NASDAQ Heat Map Example;

Figure 1A:
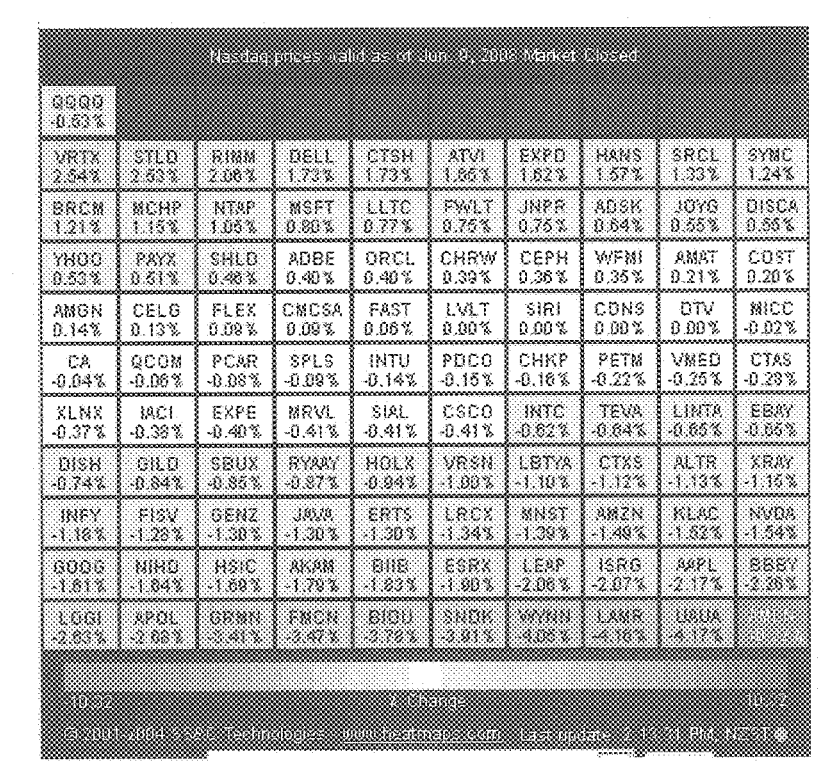
Figure 1B:
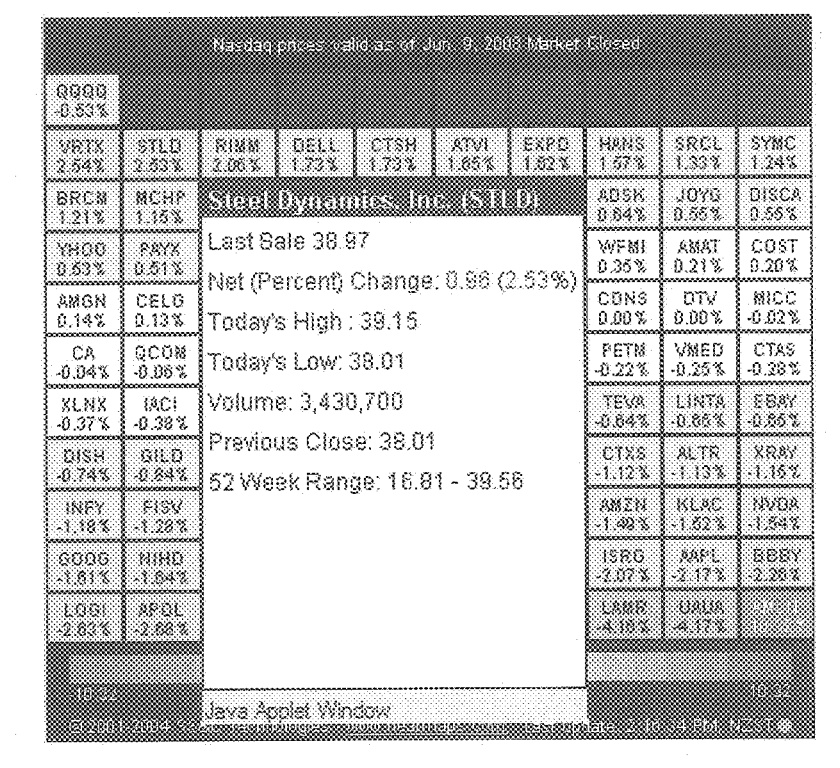

FIG. 1B shows a NASDAQ Heat Map Intra Day Data Example;

FIGS. 9A to E show diagrams relating to visualizations according to various embodiments of the present invention;

DETAILED DESCRIPTION OF THE INVENTION

Figure 1C:
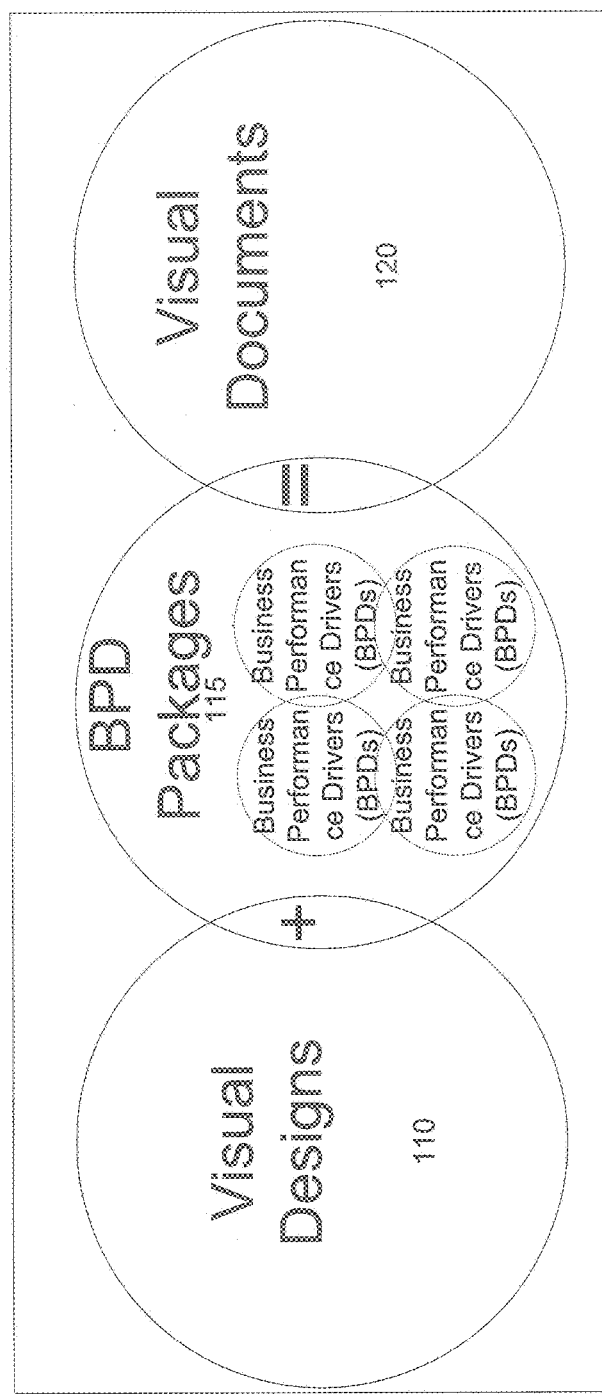
FIG. 1C shows a diagrammatical representation of some key terms.

The following described invention is suitable for use in conjunction with other methods, and the incorporation into one or more systems, for example as described in METHODS, APPARATUS AND SYSTEMS FOR DATA VISUALISATION AND RELATED APPLICATIONS (earlier filed by the applicant in the entirety as U.S. provisional patent application Ser. No. 61/074,347 filed on 20 Jun. 2008), which is incorporated by reference, and a portion of which herein follows.

Four key terms (or concepts) form the foundation of the specification set out in this document and accordingly have been defined as follows:

The four key terms are:
Business Performance Drivers (BPD)
BPD Packages
Visual Designs
Visual Documents The key terms are defined as follows:

Business Performance Drivers (BPDs): A Business Performance Driver (BPD) is a business metric used to quantify a business objective. For example, turnover, sales. BPDs are Facts (sometimes referred to as measures). Facts are data items that can be counted. For example, Gross Sales; Units Sold.

BPDs comprise of:
1. Measures: Data items that can be counted. For example, Gross Sales; Units Sold.
2. Dimensions: Data items that can be categorized. For example, Gender; Locations.
3. Restrictions can be applied to BPDs. These filter the data included. For example a restriction of 'State="CA"' may be specified to only include data for California.
4. Normalizations can be applied to BPDs. These specify (or alter) the time period the BPD refers to. For example—Daily Units Sold, Monthly Profit. The combination of BPDs, Restrictions and Normalizations provides the flexibility to create many ways of looking at data without requiring extensive definition effort.

In other words a Business Performance Driver (BPD) is a 'measure' that can be normalized. Measures are data items that can be counted. For example, Gross Sales; Units Sold. BPDs might be displayed on visualizations. For example, Revenue earned per store on a map. Restrictions and/or Normalizations could be applied to a BPD. The following table provides examples of these:

| Scenario | Business Example |
| --- | --- |
| BPD (no normalization or restriction) | Revenue |
| BPD with restriction | Revenue earned in the state of California |
| BPD with normalization | Revenue earned in week 1 of 2008 |
| BPD with restriction and normalization | Revenue earned in the state of California in week 1 of 2008 |

BPD Packages: A BPD Package is made up from a set of related BPDs. This relationship (between a BPD Package and its BPDs) is defined using metadata. BPD Packages can be thought of as the Visual Document's vocabulary.

Visual Designs: Visual Designs are a classification of the different types of visualizations that a user may choose. Within each Visual Design, there are a number of visualizations. For example, the 'spatial' category can have retail store location maps or geographical location maps.

The software solution allows users to select one visualization (one visual form within a Visual Design category) to create a Visual Document.

Visual Document: A Visual Document contains visual representations of data. Access to the data used to construct the visual representation is in many ways analogous to a textual document.

A Visual Document is constructed by applying BPD data to a specific Visual Design. It is designed to illustrate at least one specific point (using the visualization), supports the points made with empirical evidence, and may be extended to provide recommendations based on the points made. The Visual Document is a deliverable to the user.

| | |
| --- | --- |
| Dimensions | Dimensions are data items that can be categorized. For example, Gender; Locations. Dimensions might be displayed on visualizations. For example product categories on a shop floor. |
| Fact | See Business Performance Drivers (BPDs) |
| Measure | See Business Performance Drivers (BPDs) |
| Normalizations | Can be applied to BPDs. These specify (or alter) the time period the BPD refers to. For example Daily Units Sold, Monthly Profit. The combination of BPDs, Restrictions and Normalizations provides the flexibility to create many ways of looking at data without requiring extensive definition effort. Refer to definition of BPDs for examples. |
| Restrictions | Can be applied to BPDs or Dimensions. These filter the data included. For example a restriction of 'State = "CA"' may be specified to only include data for California. A BPD or Dimension could be restricted by Compound Statements (series of restrictions using AND/OR statements). For example, Revenue from all stores where state = California AND units sold > 200 units. Restrictions have the following types: |

| Restriction Type | Definition | Example | Business Context |
| --- | --- | --- | --- |
| = | Equal to | State = 'CA' | Revenue earned within the state of California |
| >= | Greater than or equal to | Units Sold >= 200 | Revenue earned from stores where units sold were greater than (or equal to) 200 units |
| =< | Less than or equal to | Revenue =< $50,000 | Revenue earned from stores where Revenue was less than (or equal to) $50,000 |
| > | Greater than | Units Sold > 200 | Revenue earned from stores where the number of units sold were greater than 200 units |
| < | Less than | Units Sold < 200 | Revenue earned from stores where the number of units sold were less than 200 units |
| IN | In (list) | State IN ('CA', 'NY') | Revenue earned from stores within the states of California and New York |
| BETWEEN | Values between X and Y | Product Code between '124' and '256' | Revenue earned from product codes 124 to 256 (inclusive) |

| | | | |
|---|---|---|---|
| NOT= | Not Equal to | State NOT = CA | Revenue earned from stores outside the state of California. |
| NOT IN | Not in (list) | State NOT IN ('CA', 'NY') | Revenue earned from outside the states of California and New York. |
| NOT BETWEEN | Values not between X and Y | Store Code NOT Between 105 and 110 | Revenue earned from stores excluding stores with a store code between 105 and 110 (inclusive). |

Heatmaps: A heat map is a graphical representation of data where the values taken by a variable in a two-dimensional map are represented as colors. A very similar presentation form is a Tree map.

Heat maps are typically used in Molecular Biology to represent the level of expression of many genes across a number of comparable samples (e.g. cells in different states, samples from different patients) as they are obtained from DNA microarrays.

Heat maps are also used in places where the data is volatile and representation of this data as a heat map improves usability. For example, NASDAQ uses heat maps to show the NASDAQ-100 index volatility. Source: Wikipedia[i]

This is shown diagrammatically in FIG. 1A. Some blocks are colored green, which means the stock price is up and some blocks are colored red, which means the stock price is down. The blocks have a varying deepening of the relevant color to indicate the direction that the stock is moving. The deeper the color, the bigger the move.

If a user hovers over a stock, additional intra-day data is presented—as shown in FIG. 1B: Source: Nasdaq.com[ii]

The key terms are set out diagrammatically in FIG. 1C. Visual designs 110 are individual visualization techniques. One or more are applied to visualize BPD packages 115 to create visual documents 120.

Many organizations are facing massive and increasing amounts of data to interpret, the need to make more complex decisions faster, and accordingly are turning to data visualization as a tool for transforming their data into a competitive advantage. This is particularly true for high-performance companies, but it also extends to any organization whose intellectual property exists in massive, growing data sets.

One objective of the described solution is to put experts' data visualization techniques in the customer's hands by skillfully guiding the end user through choosing the right parameters, to display the right data, and to create its most useful visualizations to improve business performance.

The described solution is a generic tool and can apply to multiple business areas that require decisions based on and understanding massive amounts of data. The resulting browser-based output is defined as a 'Visual Document'.

Figure 2A:
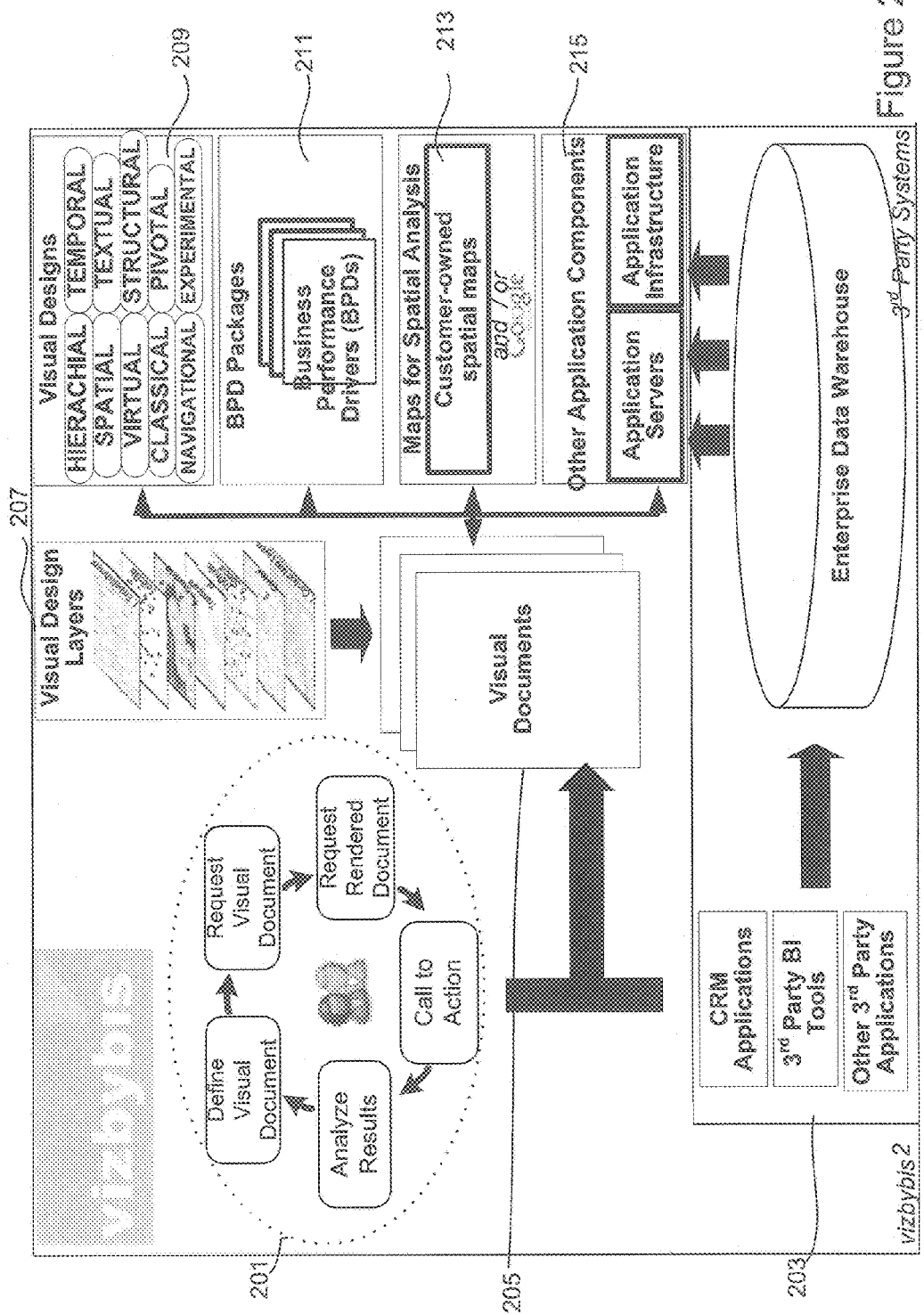
FIG. 2A shows a system concept diagram according to an embodiment of the present invention.

The solution provided is summarized in FIG. 2A.

The system identifies user tasks 201 in the form of defining visual documents, requesting visual documents, requesting rendered documents, calls to action, and analyzing results. These tasks are then detected by the system in conjunction with other systems 203, which include CRM applications, third party Business Intelligence (BI) Tools and other third party applications, all of which may access data stored in an enterprise data warehouse (EDW). The visual design layer concept 207 may be utilized within the visual documents 205. The creation of the visual documents is made in conjunction with a number of different defined visual design types 209, BPD packages 211, spatial analysis maps 213 and other application components 215, such as application servers and application infrastructure.

A Visual Document contains visual representations of data. Access to the data used to construct the visual representation is in many ways analogous to a textual document. It is constructed by applying Business Performance Driver(s) (BPD) data to a specific Visual Design (Visual Designs are grouped into ten classifications).

A Visual Document is designed to illustrate at least one specific point (using the visualization), support the points made with empirical evidence, and may be extended to provide recommendations based on the points made. The Visual Document is the actual deliverable from the software to the software user. Visual Documents may be stored, distributed or analyzed later, as needed.

The Visual Document is fed by data and a metadata database that stores definitions of BPDs—the BPDs are the focus of the Visual Document. A Business Performance Driver is a business metric used to quantify a business objective. Examples include, gross sales or units sold. For instance, the Visual Document may be used to graphically depict the relationship between several BPDs over time.

In the Visual Document, data is rendered in up to seven layers in one embodiment. However, it will be understood that the number of layers may be varied as needed by the user. Specific Visual Document Layers are described herein. However, it will be understood that further Visual Document Layers may be included over and above the specific types described.

Visual Designs are explicit techniques that facilitate analysis by quickly communicating sets of data (termed BPD Packages) related to BPDs. Once constructed, Visual Documents may be utilized to feed other systems within the enterprise (e.g., Customer Relationship Management (CRM) systems), or directly generate calls to action.

The described solution utilizes the best available technical underpinnings, tools, products and methods to actualize the availability of expert content.

At its foundation, the solution queries data from a high performance enterprise data warehouse characterized by parallel processing. This database can support both homogeneous (identical) and heterogeneous (differing but intersecting) databases. The system is adaptable for use with a plurality of third party database vendors.

A scalable advanced web server framework can be employed to provide the necessary services to run the application and deliver output over the web. A flexible and controllable graphics rendering engine can be used to maximize the quality and speed levels required to support both static and dynamic (which could be, for example, animated GIF, AVI or MPEG) displays. All components can operate with a robust operating system platform and within secure network architecture.

Pre-existing (and readily available) third party components can be employed to manage user security (e.g. operating system security), industry specific applications and OLAP (Online Analytical Processing) or other more traditional reporting. The described solution is designed to facilitate speedy and reliable interfaces to these products.

A predictive modeling interface assists the user in analyzing forecasted outcomes and in 'what if' analysis.

Strict security, testing, change and version control, and documentation standards can govern the development methodology.

Many organizations are facing massive and increasing amounts of data to interpret, the need to make more complex decisions faster, and accordingly are turning to data visualization as a tool for transforming their data into a competitive advantage. This is particularly true for high-performance companies, but it also extends to any organization whose intellectual property exists in massive, growing data sets.

This clash of (a) more data, (b) the increased complexity of decisions and (c) the need for faster decisions was recently recognized in an IDC White Paper (Gantz, John et. al.; IDC White Paper; "Taming Information Chaos: A State-of-the-Art Report on the Use of Business Intelligence for Decision Making" November 2007), which described this clash as the "Perfect Storm" and that this 'storm' will drive companies to make a quantum leap in their use of and sophistication in analytics.

Today's business tools and the way they operate barely allow business users to cope with historical internal data, let alone internal real time, predictive, and external data.

Hence, a new paradigm in business intelligence solutions is required.

System Overview

As explained above, FIG. 2A shows a high-level overview of the system.

There are five key components to the system. These are:
1. Visual Documents;
2. Visual Designs;
3. Business Performance Drivers (and BPD Packages);
4. Spatial Maps;
5. Application Components.

A description of each of these components is set out below under the respective headings.

Visual Documents

The Visual Documents form the core of the solution from a user perspective. This may include visualization(s), associated data and/or metadata (typically the visual form) that the user defines requests and interacts with. The Visual Documents may consist of single frames or animated frames (which could be, for example, implemented in AVI, GIF or MPEG format or a sequence of still images).

The Visual Document is typically viewed in a dynamic web browser view. In this interactive view the user may observe, select and navigate around the document.

Once created, the Visual Documents may be stored in the database and may be distributed to key persons (printed, emailed etc.) or stored for later use and analysis.

Visual Designs

The Visual Designs are a classification of the different types of visualizations that a user may choose. Within each Visual Design category, there are a number of visualizations. For example, the 'spatial' category can have retail store location maps, network maps or geographical location maps, such as, for example, maps available from Google™ or Yahoo™.

The described system allows users to select one or more visualizations (e.g. one visual form within a Visual Design category) to create a Visual Document.

There are ten Visual Design categories defined below, however it will be understood that further Visual Designs are envisaged, as well as the number of visualizations within each classification and the number of classifications.

Visual Designs are a classification of the different types of visualizations that a user may choose. Within each Visual Design, there are a number of visualizations.

For example, the 'spatial' category can have retail store location maps or geographical location maps.

The visual design types include:
Hierarchical
Temporal
Spatial
Textual
Virtual
Structural
Classical
Pivotal
Navigational
Interactive 1. Hierarchical Visual Designs One purpose of a hierarchical visual design is to present large scale hierarchical data in one display. It is a picture for understanding, monitoring, exploring and analyzing hierarchical data.

Key elements of hierarchical visual designs are:
Data is hierarchical.
Structure of data can determine hierarchy.
They can be overlaid with connections.

This type of visualization may be automatically generated from a table of contents. This automatically generated hierarchy then becomes a special layer over which specific information can be overlaid.

The Hierarchical Visual Design is a hierarchical diagram such as an organizational chart or a correlation matrix.

This Visual Design has at least one natural centre and typically has a higher density toward the fringes of the visualization. The Hierarchical Visual Design can typically be considered as a 'tree' structure. The nodes and vertices within the tree structure are best if they are generated automatically from a dataset. This tree structure is a good example of a Special Layer.

The development process will include building a tree that is optimized for this type of Visual Design including heat mapping techniques.

Large scale hierarchical data is represented using various techniques such as mapping to icons, shapes, colors and heights.

Typical uses include mapping of web pages, organizational charts, decision trees and menu options.

2. Temporal Visual Designs

One purpose of a temporal visual design is to present temporal based data, such as, for example, revenue per day, in a specially designed calendar or time series view. This calendar view will enable users to view thematic layers that display BPD information such as revenue or sales.

This type of visual design is a completely data defined Visual Design. The key input values are typically 'start' and 'end' dates along with the 'number' of variables to be displayed.

The simplest, and potentially the most useful, Visual Design Special Layer may be a carefully drawn calendar. The calendar may then become a useful Visual Design for date-based Visual Documents.

Temporal analysis is one of the fundamental methods of almost all analysis. Using temporal high density visualizations, users will be able to overlay high density Thematic Layers on well designed Special Layers such as the spiral data visualization shown in the above examples. This analysis can be applied in everything from customer frequency and spend analysis to analysis of the impacts of time of day on the management of a mobile phone network.

It is considered that temporal design patterns are particularly important in terms of analytics as the majority of analytics are time based. Described herein are several examples of producing temporal visual designs.

Non Contiguous Time—For example, weekends can be represented in some interesting ways. The simplest way being not to show them.

Non-linear Time—This allows multiple years of history to be shown where the oldest data is spatially compressed in the Visual Design.

Temporal Special Layers—These can be used to compare quite disjointed types of data. For example, the relationship between external public events, operational payroll sizes and sales revenue. There exists no easy way to numerically join this data together, visually this data can be joined. The technique combines well with simple correlations as it is possible to combine these distinct datasets to show correlations.

Control—One important consideration in visualizing temporal data is the gaining of scientific control. For example, seasonal variables. This is particularly interesting as one year is always different from the next. Quite simply, the start date of each year is never the same as the next, and moving external events such as Easter and 'acts of God' such as weather make precise comparison very difficult.

3. Spatial Visual Designs

One purpose of a spatial visual design is to present an overview of large scale numerical data in one spatial display (i.e. a space) for understanding, monitoring and analyzing the data in relation to a space.

This type of visual design combines together base maps provided by third parties with rendered thematic layers. These "mash-ups" are user definable and accessible to users.

For example, third party base maps may include customer-owned spatial maps or readily available base maps such as those provided by Google™ Maps or Yahoo™ Maps. The system provides powerful thematic layers over one of these spatial base maps.

One example of a spatial visual design is available at www-.weather.com[iii]. This map shows two layers—(1) an underlying heat map overlaid with (2) actual temperature at specific cities. The points are useful as the state boundaries allow the user to determine with relative ease which city is being referenced. The underlying heat map is useful as it allows the user to see the overall trend at a glance.

A second example is available at Information Aesthetics[iv]. This example shows the travel time from the centre of London outwards using various methods of travel. The use of heat maps here shows very clearly the relationship between distance from the centre of London and travel time.

In a further example, the 'spatial' category of visual design can have retail store location maps, network maps or geographical location maps, such as, for example, maps available from Google™ or Yahoo™

Numerical data may be independently mapped using parameters such as hue, saturation, brightness, opacity and size distributed across a defined geographical space.

Geographic mapping has a wide range of uses. In fact with the wide availability of high quality base maps, the world is becoming spatially enabled. Mapping applications can be used for a huge variety of tasks, from customer relationship management to drive time analysis, site selection to insurance risk analysis and telecommunications network analysis.

4. Textual Visual Designs

One purpose of textual visual designs is to enable business users to interact and query seamlessly from the structured to the unstructured world.

While it is possible to do basic numeric analysis on variables such as hit frequency and number of clicks per hour, the key method is to use a special layer to construct a sensible schematic of the unstructured data then overlay BPDs. Simply put, the described solution will leverage information visualization to bring structure to the unstructured world.

For example, a heat map may be used as part of a textual visual design.

Unstructured textual information is a huge area of growth in data storage and intuitively, the business intelligence industry expects this data to become a valuable asset. The described solution provides information visualization capabilities that overlay and draw out the non-numeric, but actionable, observations relating to unstructured data, in order to link the numeric data warehouse to the unstructured world.

There are a multitude of Special Layers that may be used with textual data. These textual Special Layers extend from building self organizing maps of textual information to diagrams showing the syntax hierarchy of the words used in a document.

A self organizing map (SOM) consists of components called nodes or neurons. Associated with each node is a weight vector of the same dimension as the input data vectors and a position in the map space. The usual arrangement of nodes is a regular spacing in a hexagonal or rectangular grid. The self-organizing map describes a mapping from a higher dimensional input space to a lower dimensional map space. The procedure for placing a vector from data space onto the map is to find the node with the closest weight vector to the vector taken from data space and to assign the map coordinates of this node to our vector—Source: Wikipedia.

5. Virtual Visual Designs

One example of a virtual visual design is a 3D representation of a virtual environment. 3D worlds generate far more accurate and complete data than the real world. As these 3D worlds grow in popularity and become more immersive, the potential for business intelligence tools to be applied to this environment grows significantly.

One example application of the use of a virtual visual design is a retail space analysis tool where transaction data is under-laid as the color of the carpet or shelves. In the case of the shelves, the shelves can also show representations of the products on the shelves.

6. Structural Visual Designs

One purpose of a structural visualization is to illustrate the structure of the data. For example, network topology or interconnection between data elements. The interconnections in the examples below show how a simple Special Layer construct can be used to illustrate quite complex connections.

One example of a structural type visual representation is that of the London underground map. The London underground map is a key historic map showing the schematic topology of the London underground. Using this map travelers can intuitively plan out complex routes and interconnects. Without this visualization, navigating the London underground system would be significantly more difficult and complex to understand.

These structural visualizations are very powerful and are closely related to spatial visualizations. Most of the thematic treatments that can be applied to a spatial visualization are equally applicable to a structural visualization.

Examples of uses for such a visual design type would be for visualizing call routing across a network, electricity grid management and route optimization.

It will be understood that a wide variety of Special Layers may be created in this space. These Special Layers essentially generate the structural schematic from the base data.

Typically the interconnections between nodes are used to generate the structure. One important aspect of the structural Special Layer is building the structure in such a way that interconnect line crossing is minimized 7. Classical Visual Designs Traditional charts provide a simple, common and well-established way of presenting data using classical visual designs. However, traditional charts are user-skill dependent and the herein described system may be used to apply guided Visual Design techniques to traditional charts to significantly extend their usefulness.

One example would be to show a line chart of Speed Vs Time in a simple two dimensional line graph. This type of basic graph shows the data clearly and allows the user to observe any geometric trends.

Some common charts that fall into this design category are as follows:

Scatterplots—Are Cartesian coordinates to show the relation of two or more quantitative variables.

Histograms—Typically show the quantity of points that fall within various numeric ranges (or bins).

Bar graphs—Use bars to show frequencies or values for different categories.

Pie charts—Show percentage values as a slice of a pie.

Line charts—Are a two-dimensional scatterplot of ordered observations where the observations are connected following their order.

8. Pivotal or Quartal Visual Designs

Different visualization methods have been suggested for high-dimensional data. Most of these methods use latent variables (such as principal components) to reduce the dimensionality of the data to 2 or 3 before plotting the data. One problem with this approach is that the latent variables sometimes are hard to understand in terms of the original variables.

The parallel coordinate (PC) scheme due to Inselberg and others attempts to plot multivariate data in a completely different manner. Since plotting more than 3 orthogonal axis is impossible, parallel coordinate schemes plot all the axes parallel to each other in a plane. Squashing the space in this manner does not destroy too much of the geometric structure. The geometric structure is however projected in such a fashion that most geometric intuition has to be relearned, this is a significant drawback, particularly for visualization of business data.

Pivotal or Quartal visual designs allow the user to display higher dimensional data in a lower dimensional plot by ranking and splitting variables across various axes. This method may for example be used to display 3D data in a 2D plot.

9. Navigational Visual Design

Navigational visualizations use a highly visual interface to navigate through data while maintaining the general context of the data. This data visualization method may use other visual design types so it is differentiated more by the style of how it is used than the implementation standard.

Photosynth for example is a powerful navigational tool for moving between images, its display is designed for navigation of large numbers of linked images.

One illustrative navigational representation example is shown by Ubrowser. This navigational visualization example shows web pages represented in a geometry design. The web pages can be navigated through by spinning the cube shown in the example.

Navigational visualizations are designed for users to interactively move through the data. The objective of the visualization is to present a large volume of data in such a way as to enable users to move through the information and gain an understanding of how the data links together.

A number of display techniques are known for displaying information with regard to a reference image (the combination referred to as primary information). Where the limit of primary information is reached a user may wish to know more but be unable to further explore relevant information. A user may also simply wish to explore other aspects although there is more primary information to explore.

A key element of navigational visual designs is that they are interactive and are designed to assist in data navigation and data way-finding rather than for analytical purposes.

10. Interactive Visual Designs

This classification is for significantly advanced or interactive visual designs which do not fit within the preceding classifications.

These visualizations vary in nature from pure abstract forms to more tangible forms of visualizations. The key difference is that these visualizations may not be classified within the preceding Visual Design classifications due to their advanced nature or interactivity.

Any Visual Design layer considerations will be dependent on the interaction being considered.

There is opportunity to use common associations to provide iconic views of key events; the common associations are created using the interactive tools and asking users for feedback on the relevant icons. This feedback is then developed into a learned interactive system to provide iconic data representations.

Eye movement sensors can be used to control the interactivity and to learn information about relevant icon usage and control interactivity.

A wide range of user interfaces are used in conjunction with computer systems. Generally these are simply used to provide command or data inputs rather than to analyze the underlying behavior of a user in the context of the operation of a software application.

It would be desirable to operate software applications running on a computer on the basis of observed user behavior in the context of a software application.

Business Performance Drivers (and BPD Packages)

Business Performance Drivers (BPDs) are a metric applied to data to indicate a meaningful measurement within a business area, process or result. BPDs may be absolute or relative in their form of measurement.

The Business Performance Driver (BPD) concept differs from the known KPI concept by introducing BPDs that (1) may have multiple dimensions, (2) place the BPD in the context of the factors used to calculate them, (3) provide well understood points of reference or metadata around which visual document creation decisions can be made, and (4) may contain one or more methods of normalization of data.

Common groups of BPDs are called BPD Packages. For example, BPDs relating to one industry (say, telecommunications) can be grouped into one BPD Package. BPDs may be classified into one or more BPD Packages. For example, Net Revenue with normalizations available of per customer or per month may be applicable in a number of industries and hence, applicable to a number of BPD Packages.

Spatial Maps

Spatial maps allow for a user-owned and defined spatial map and/or for the user to use publicly available context maps such as Google™ Maps or Yahoo™ Maps. In either case, the user can display selected BPDs on the chosen spatial map.

Typically, a user-owned spatial map may be the inside floor space of a business and a publically available context map may be used for displaying BPDs on a geographic region e.g. a city, county, state, country or the world.

Application Components

The described application includes two main components, the Application Servers and the Application Infrastructure.

The Application Server includes a number of servers (or server processes) that include the Rendering Engine (to make (or render) the Visual Documents), Metadata Servers (for the BPD Packages, the Visual Designs and the BPDs) and the Request Queue.

The Application Infrastructure is also comprised of a number of servers (or server processes) that may include a Listener (which 'listens' for document requests) and central error logging.

Based on the user selections made above (Visual Documents, Visual Designs and BPDs), the user can click on an action and send a communication to a third party system (CRM, Business Intelligence or other application). The third party system could, for example, load the list from the solution and then send out a personalized email to all members on that list.

According to one embodiment, the described server components of the application are a Java based application and utilize application framework such as the IBM™ WebSphere application server framework, other platforms and server applications may be utilized as alternatives. The client application may be a mashup that utilizes the server components or it could be a rich internet application written using the Adobe™ Flash framework.

Other key elements of the system may include:

Parallelism—Parallel processing to increase responsiveness or to increase workload scalability of queries or Visual Documents. This parallelism may also decrease response time for larger visual documents in particular animated images may be executed in a parallel fashion.

Security—System and user-access security. This security may be a combination of authorization and authentication. The security framework may be implemented using the application framework.

Map Updates—A map management tool to update user-owned spatial maps.

Predictive Modeling—This may be an interface to third-party predictive models.

Configuration Tools—The application may be supported by configuration tools to enable rapid deployment of the application.

Modular Overview

Module Descriptions

Figure 2B:
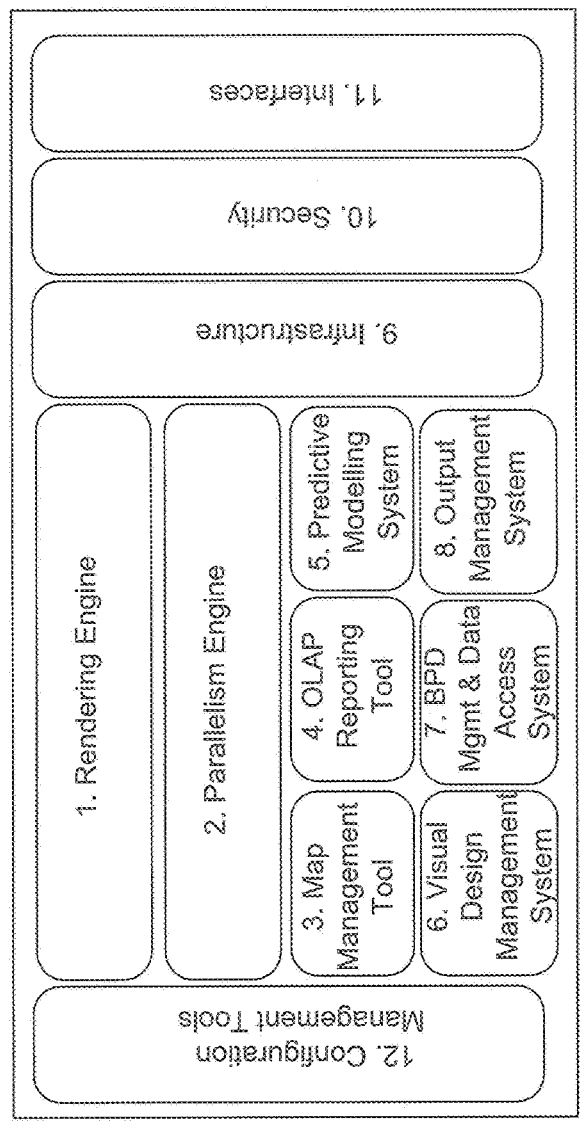
FIG. 2B shows an overview of the software modules in the described system.

The diagram shown in FIG. 2B shows an overview of the software modules in the described system.

These modules are described in the subsequent table. More detailed descriptions and diagrams of each of the software modules are provided below.

The table below outlines the following four items in relation to each module:

1. Technology System Component: This is the name given to the system component; this name matches the name in the above diagram.
2. High Level Functional Description: Describes the role of the software module.
3. Caching: Indicates whether this module uses caching to optimize performance.

| | Technology System Component | High Level Functional Description | Caching |
|---|---|---|---|
| 1. | Rendering Engine | Produces images and animations; could use Google ™ Maps or Yahoo ™ Maps for spatial context map. The development of Special Layers enables Visual Document produced to have unique capabilities that were not previously readily available. | Yes |
| 2. | Parallelism Engine | Enables parallel execution of requests for high volume of Visual Document output and rapid results delivery to users. The preferred application framework selected is the IBM ™ WebSphere product. This framework enables the application to be scaled across multiple servers. | Yes |
| 3. | Map Management Tool | Provides key map editing features (specifically CAD like) and map version control (desktop and enterprise) tools. | Yes |
| 4. | OLAP Reporting | Industry standard online analytical reporting. For example, sorting, filtering, charting and multi-dimensional analysis. It is desirable that the user interaction with the data selection process in the data view is seamless with the data visualization view. For example, if the user selects 5 customers from the data view, the same 5 customers should be selected in the visualization view. This means that the solution may be a hybrid view (as discussed later). This hybrid view is a 'simple' view and is an interface to an industry leading OLAP tool. One option includes interfacing to the OLAP tool via a JDBC interface from the described solution or a web service model for the selection management. | Yes |

| | Technology System Component | High Level Functional Description | Caching |
|---|---|---|---|
| 5. | Predictive Modeling System | An interface to external predictive modeling engines; may also have some modeling systems. For example, Self Organizing Maps (SOM). | Yes |
| 6. | Visual Design Management System | Tools for users to manage the different Visual Designs. | No |
| 7. | BPD Management and Data Access System | Tools for users to manage the different BPD Packages and their associated BPDs. Contains Data Access capability that enables data to be queried from RDBMS (or potentially other data sources). | No |
| 8. | Output Management System | For management of the documents (Visual Documents) within the system. | Yes |
| 9. | Infrastructure | Core system management functions including system logging and Request Queue management. The Request Queue is also described under parallelism and there may be crossover between these two module descriptions. | Yes |
| 10. | Security | Enables access to the system (or parts thereof) to be properly controlled and administered. | No |
| 11. | Interfaces | Allows services to be called by (or to call) external applications. | No |
| 12. | Implementation Tools | Tools to deploy and configure the software system. | Yes |

Architectural Views of the System

This section contains descriptions and diagrams of the architectural views of the system. The architecture shows how the system components fit and operate together to create an operational system. If compared to a vehicle, the wiring diagrams, the physical body, the driving circle and key complex components like the engine would be shown in architectural views.

This view does not describe how the system is written; it describes the high-level architectural considerations.

Architectural considerations are typically implemented by one or more software modules. The modular view described herein lays out a high-level view of how the software modules are arranged.

Figure 3:
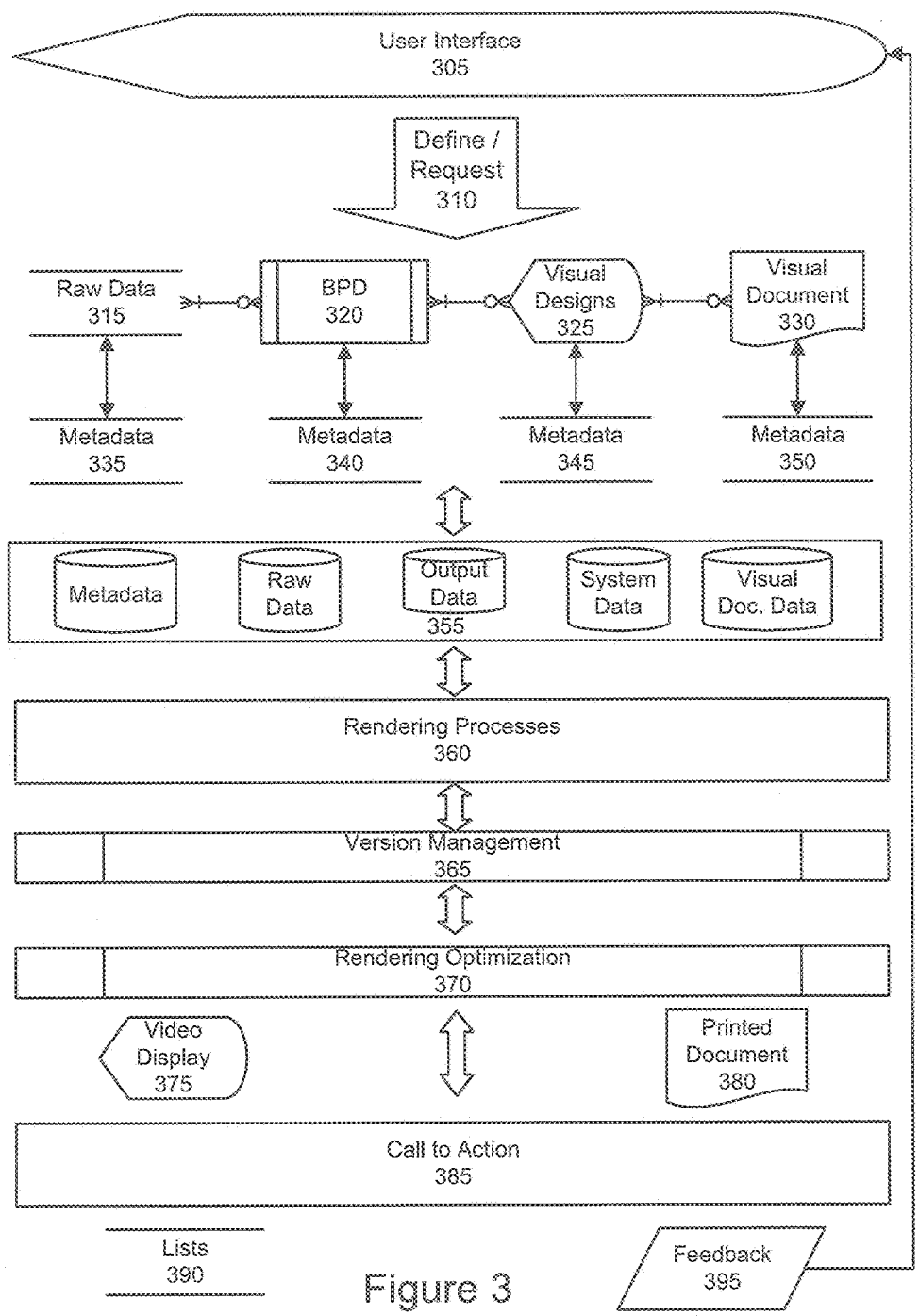
FIG. 3 shows a general overview of the data flow within the system according to an embodiment of the present invention.

FIG. 3 shows a general overview of the data flow within the system.

Figure 4:
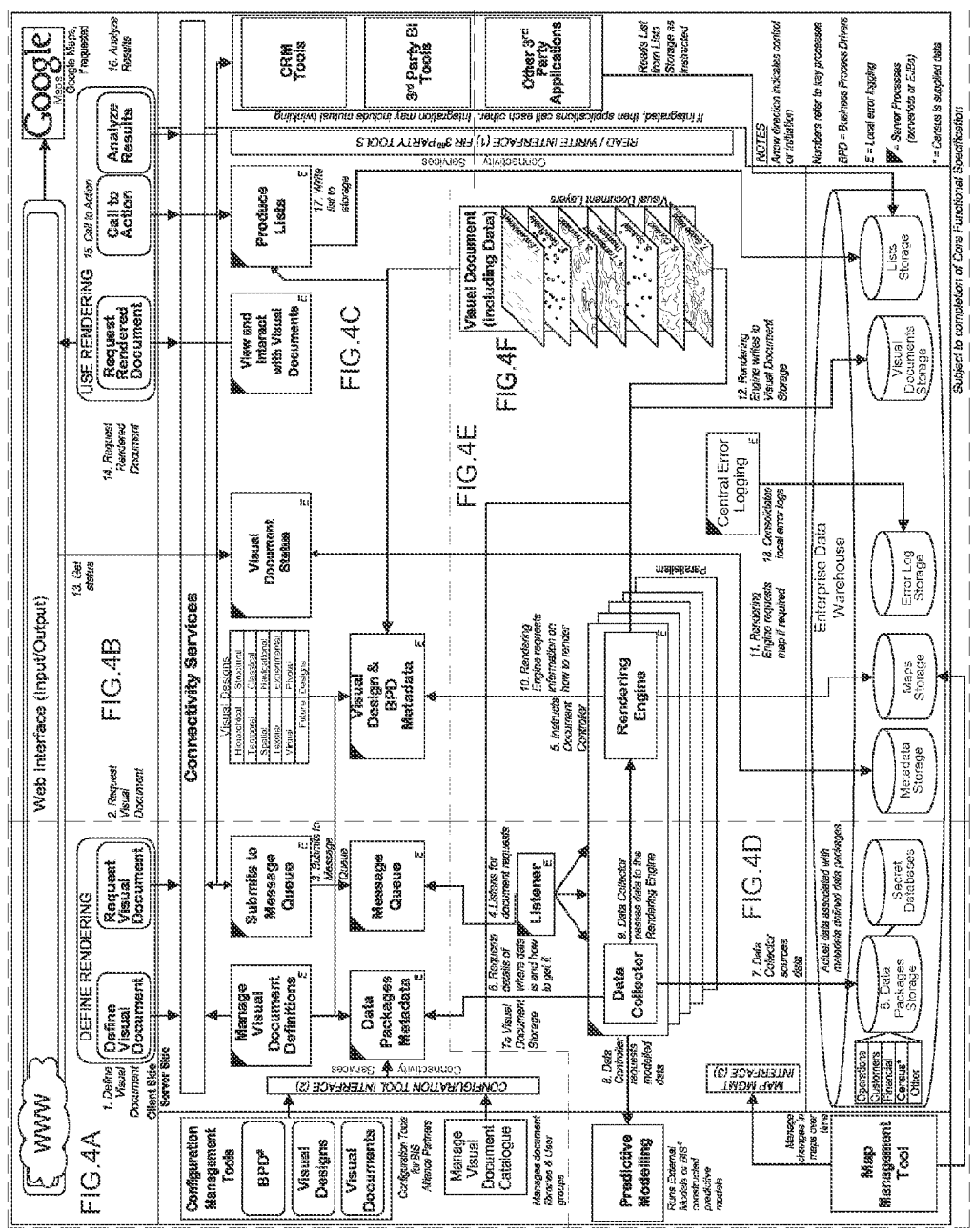
FIG. 4 shows an architectural overview of the described solution according to an embodiment of the present invention.
Figure 4A:
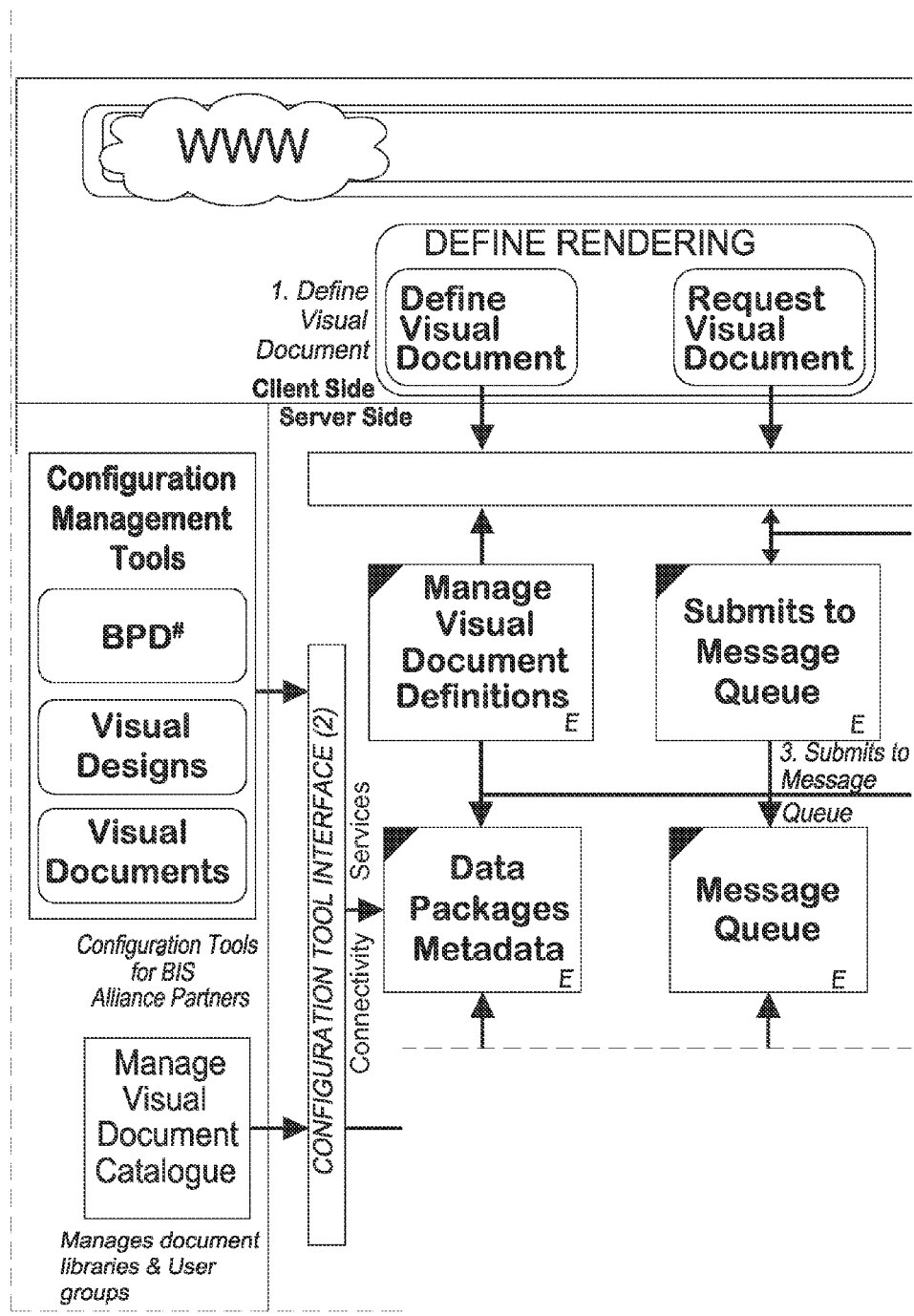
Figure 4B:
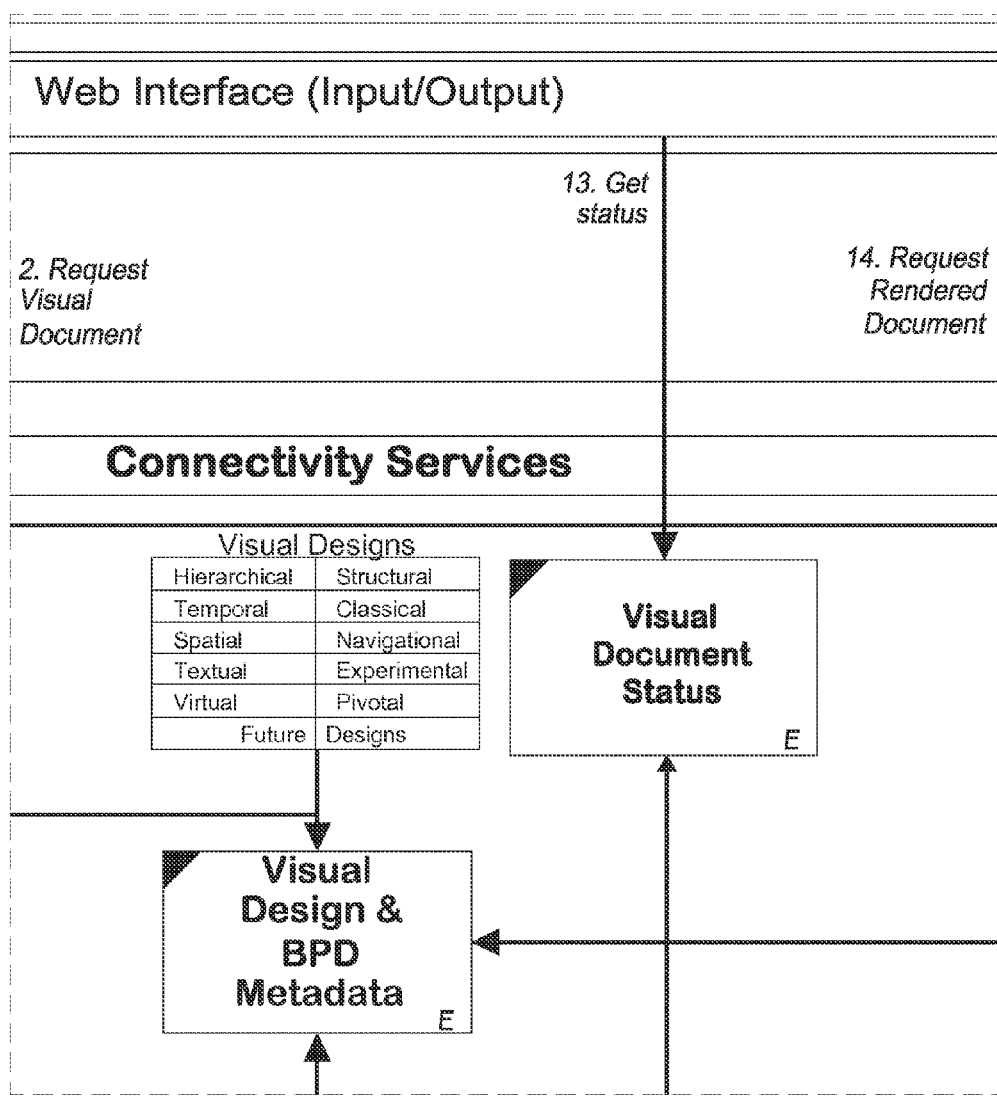
Figure 4C:
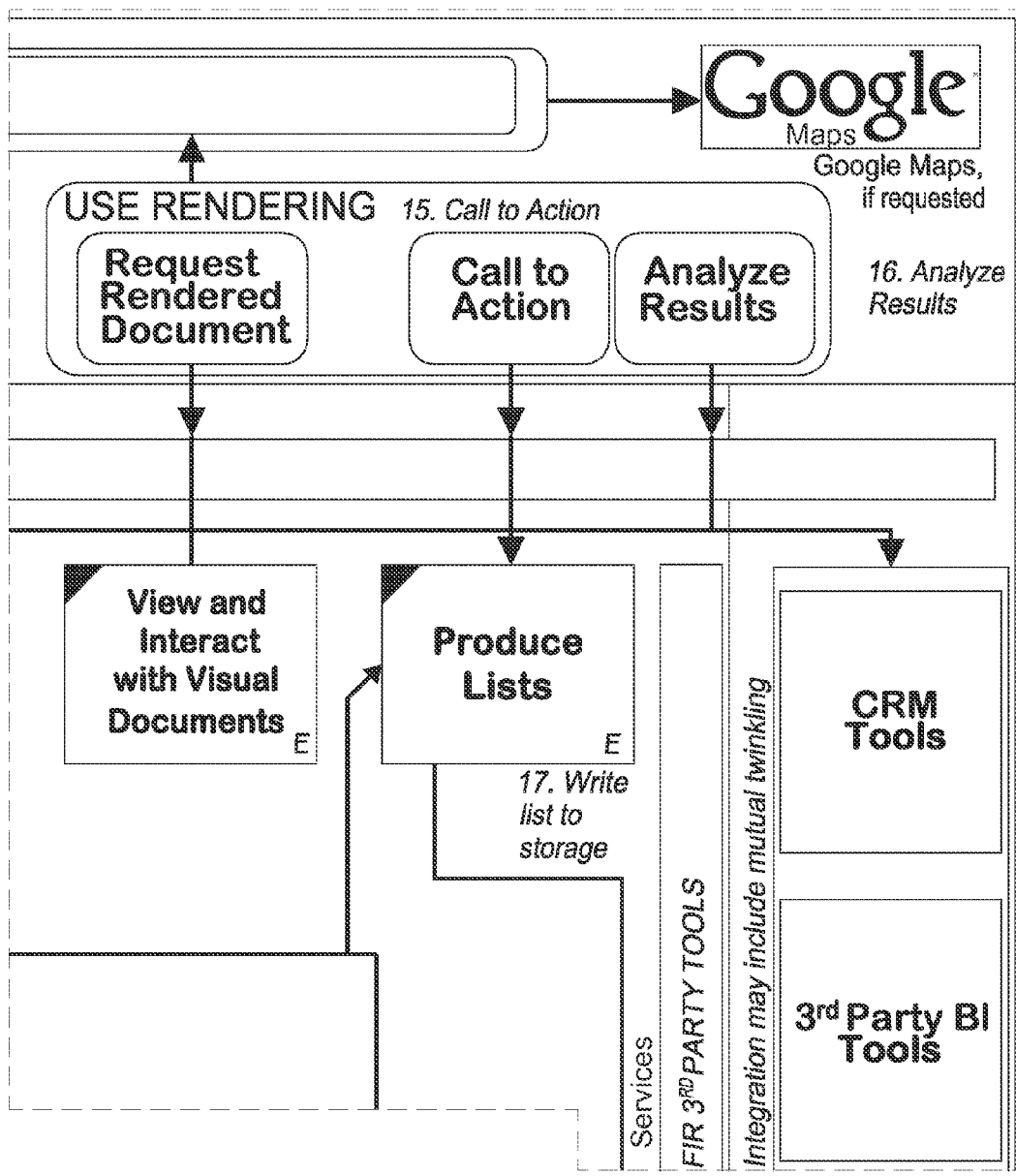
Figure 4D:
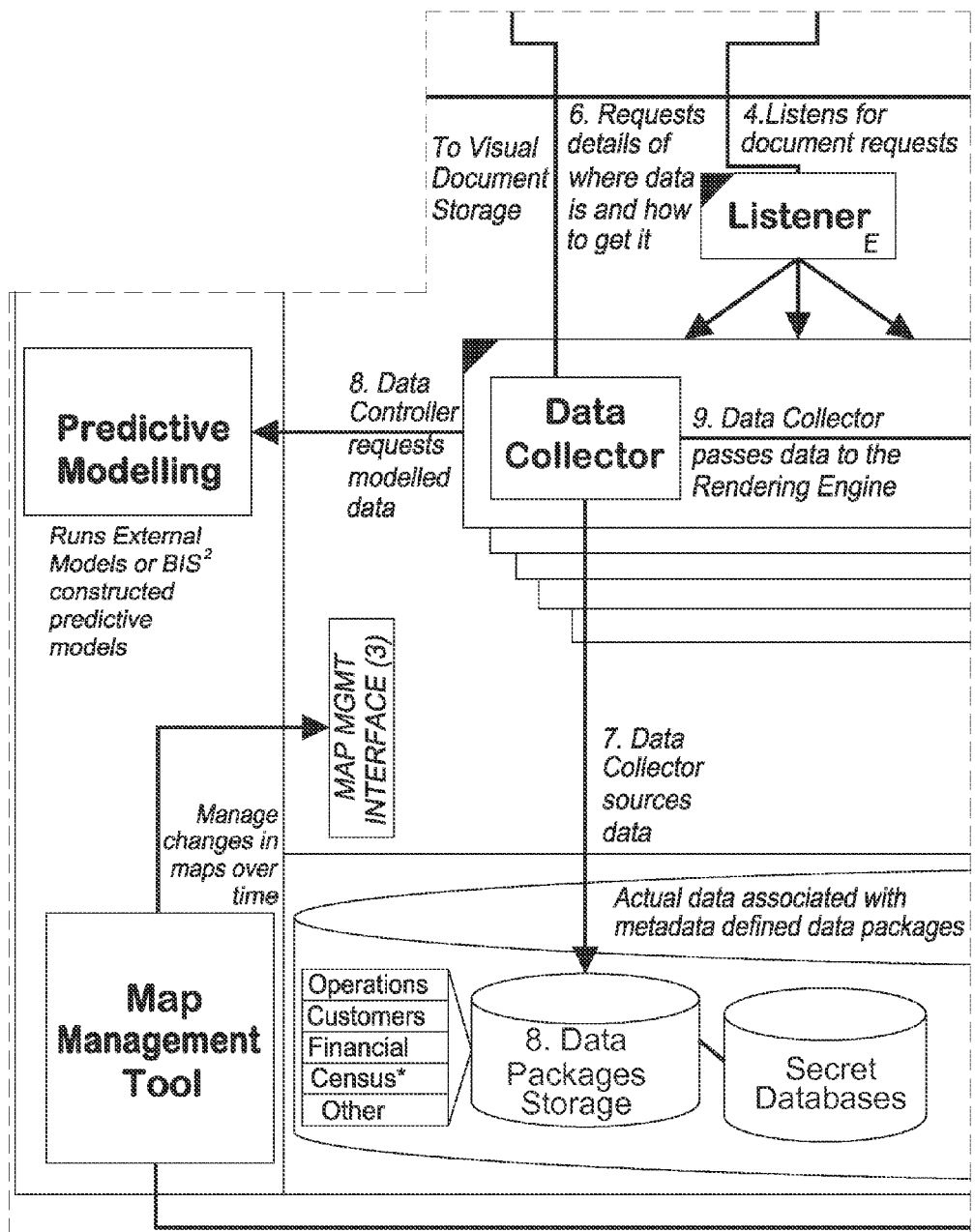
Figure 4E:
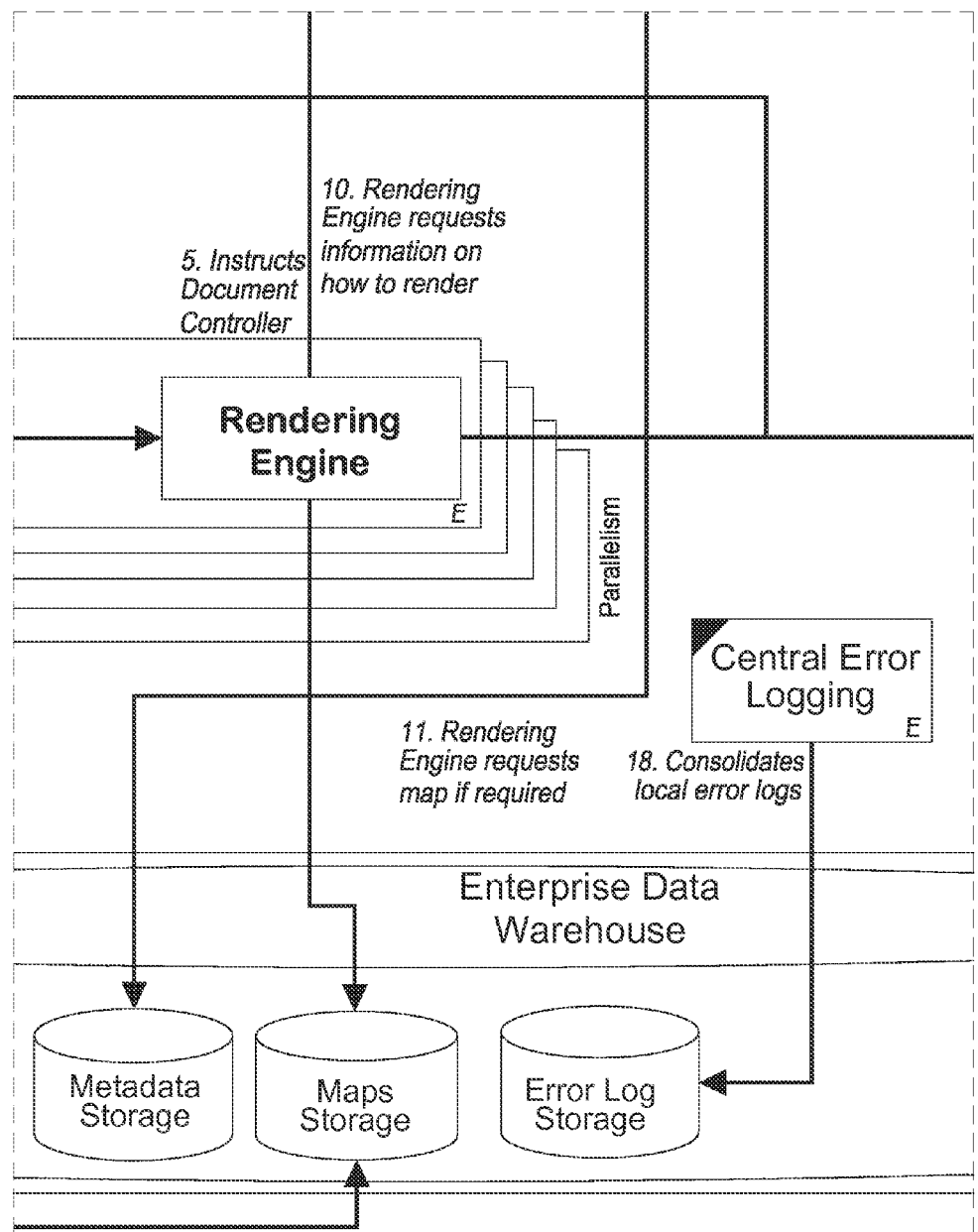
Figure 4F:
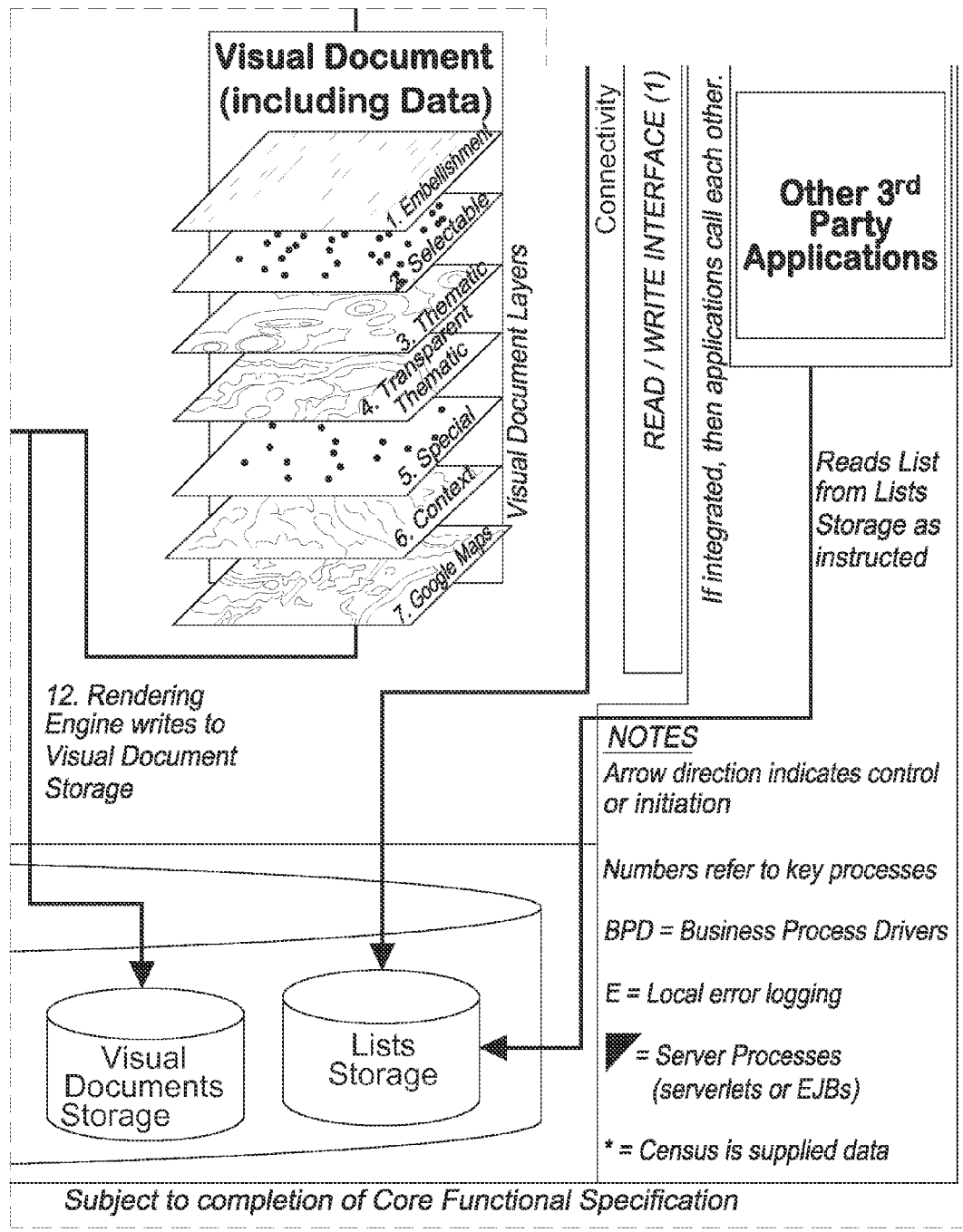

FIG. 4 shows the architectural overview of the described solution. This diagram is elaborated by the diagrams and descriptions in following sections of this document.

The following modules or components are shown:

Web interface Module 4105: User interfaces are browser based or may be a web services client, a rich internet application or may be a thick client. In all cases the user interface uses the same interface to the back end services.

Rendering Definition Module 4110: The user interface is used to define and request the rendering of Visual Documents Rendering Use Module 4115: Visual Documents are used for analysis, and precipitate calls to action.

Connectivity Services Module 4120: The definition and rendering of Visual Documents is performed through a set of programs or services called the Connectivity Services.

Configuration Management Tools Module 4125: Multiple versions of the basic elements; BPD, Visual Design, Visual Documents; are managed by a set of programs called the Configuration Management Tools.

Visual Document Management Catalog 4130: One such Configuration Management Tool (4125) is a set of programs that manage a users' catalog of available Visual Documents.

Predictive Modeling Module 4135: Predictive modeling is used for forecasting unknown data elements. These forecasts are used to predict future events and provide estimates for missing data.

Map Management Tool 4140: Another of the Configuration Management Tools (21125) is the Map Management Tool. It is designed to manage versions of the spatial elements of a visual design such as a geographic map or floor plan.

Visual Document Definitions Management Module 4145: Visual Document Definitions are managed through the use of metadata (4175).

Message Queue Submission Module 4150: Requests for Visual Documents are handled through queued messages sent between and within processes.

Visual Design Type Module 4155: Visual Documents are comprised of one or many Visual Designs in these categories.

Visual Document Status Module 4160: The status of Visual Documents is discerned from the metadata and displayed on the user interface.

Interaction and Visual Document View Module 4165: The user interacts with the Visual Documents through the user interface, and appropriate changes to and requests to read are made to the metadata.

List Production Module 4170: Where additional output such as customer lists are required, they are requested using the user interface and stored in the EDW (4215).

Data Packages Metadata Module 4175: Metadata is used to describe and process raw data (data packages).

Message Queue Module 4180: Messages may be queued while awaiting processing (4150).

Visual Design and BPD Metadata Module 4185: Metadata is used to describe and process the BPD's and Visual Designs associated with a particular Visual Document.

Visual Documents Module 4190: Visual Documents may be comprised of layered Visual Designs.

Third Party Modules 4195: Visual Documents may be used with or interact with other third party tools.

Listener Module 4200: The listener processes messages (4150) in the message queue (4180)

Document Controller Module 4205: The document controller is used to provide processed data to the rendering or query engines.

Central Error Logging Module 4210: System errors are detected and logged in the EWP (4215).

EDW 4215: All data is typically stored on a database, typically, multiple fault tolerant processors in an Enterprise Data Warehouse.

The following architectural components are described in more detail.

| Architectural Component | Description |
|---|---|
| Connectivity Services | This is a common communication service that is used when sending messages between systems (i.e. the described solution and 3$^{rd}$ party tools) and between the described application layer and the user interface layer. |
| Configuration Management Tools | Allows specialized users to configure Visual Designs and Visual Documents to their needs-which differ from the default configuration provided. |
| Manage Visual Document Catalog | Gives selected users the ability to search, sort, group, and delete Visual Documents in the Visual Document Catalog. |
| Predictive Modeling | External modeling systems that use data sent from the described solution to perform complex calculations to produce predictive data. This predicted data is piped through the described solution to the user. |
| Map Management Tool | This is an application that enables users to create modify and delete individual maps to manage the complete sequences, this is very appropriate for management of floor plans. |
| Data Packages Metadata | The services responsible for providing metadata that enables the requester (typically, Data Collector) to source the data for the BPD. |
| Visual Design & BPD Metadata | The services responsible for providing the metadata to the requester (typically the Rendering Engine) that enables the construction of the Visual Documents. |
| Request Queue | The Request Queue manages the communication of requests for rendering of Visual Documents. These communications may be scheduled. |
| Document Controller | The Document Controller consists of two components. The first is the Data Collector responsible for reading the appropriate metadata and retrieving the data from the EDW (Enterprise Data Warehouse). This data is passed to the Rendering Engine that is responsible for producing the Visual Document. Document Controllers run parallel Visual Document requests, build and store documents. |
| Read/Write Interface for 3$^{rd}$ Party Tools | The described solution provides a common interface for 3$^{rd}$ party tools to communicate with e.g. CRM applications. |
| 3$^{rd}$ Party BI Tools | One of the 3$^{rd}$ party tools that the described solution may integrate with is an external OLAP tool. |
| Secret Databases | Secret databases are a method of sharing encrypted databases and providing a SQL interface that enables end users to run queries against atomic data without discovering the details of the data. |

The following terms have been also been used in FIG. 4. These are explained in more detail below.

| Architectural Component | Description |
|---|---|
| Logging | Logging (for example, error logging and access logging) is an inherently difficult activity in a parallel independent and predominantly stateless system.<br>The main issue that arises is that logging presents potential links between systems and therefore dependencies.<br>Typically within the application, each server will be responsible for its own logging. This ensures that the system scales without degradation in performance. A separate process (central log reader) may be used to consolidate these logs dynamically as and when required. |
| Web Server | Web Servers respond to requests from users to provide Visual Documents. They read any required information from the metadata servers and Visual Document storage servers. If necessary they write Visual Document requests to the Request Queue. |
| Metadata Servers/Storage | Metadata servers are responsible for storage and user views of metadata. The metadata servers are also responsible for the validation of user rights to read Visual Documents (within the application). |
| Visual Document Storage | The Visual Document Catalog is a secure storage for all Visual Documents. Access is only possible when security requirements are met. |
| Data Collector | Typically the data collector queries the customer's data warehouse. The data warehouse can be augmented with additional subscribed embellishment data. This will provide the raw data that is represented visually back to the user. |
| BPD Packages Metadata | The described solution will use metadata to define groups of BPDs. These groups of BPDs are called BPD Packages. BPD Packages enable both internal data measures to be efficiently installed and external datasets to be provided.<br>BPD packages contain no data. |

Figure 5:
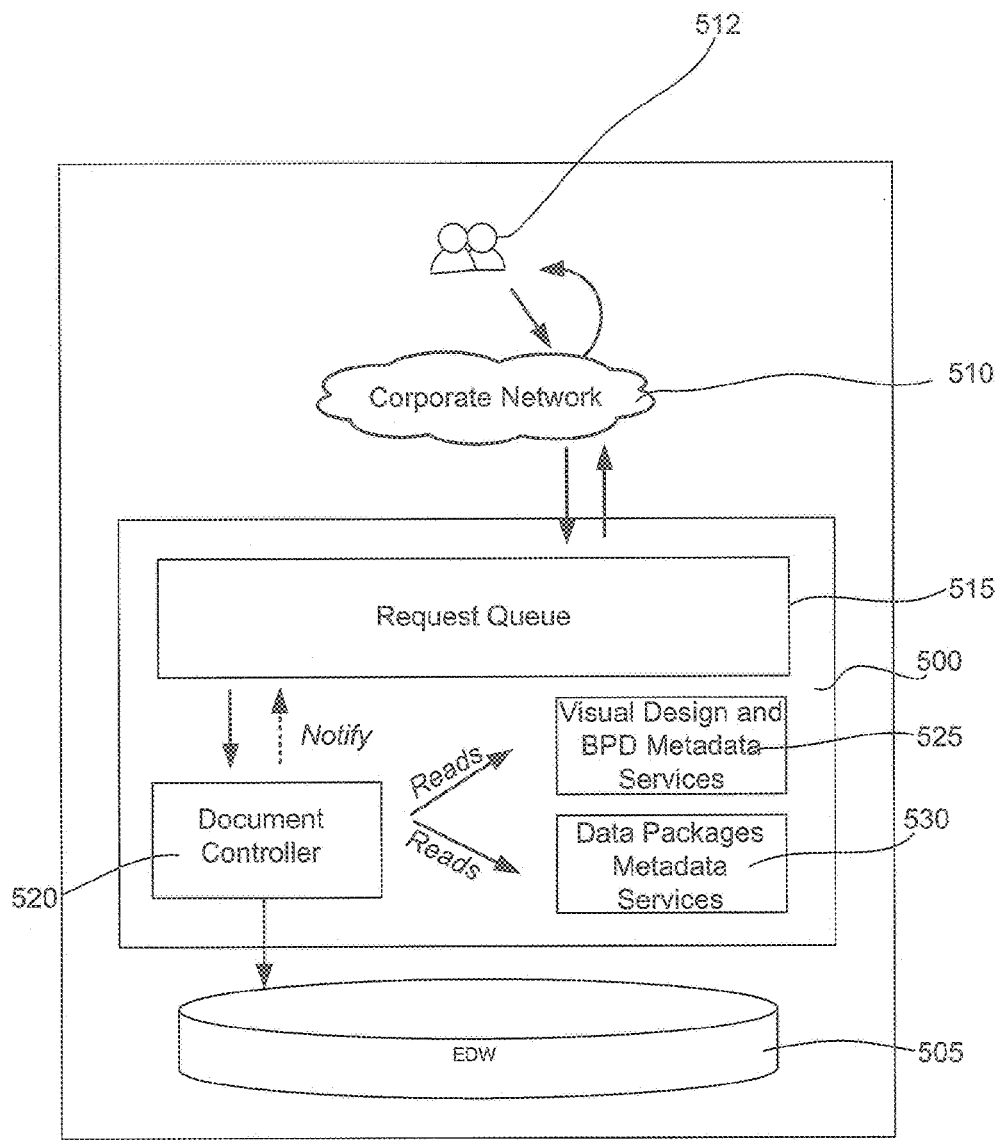
FIG. 5 shows a high-level system delivery overview of the described solution according to an embodiment of the present invention.

A further high-level system delivery overview of the solution is set out as shown in FIG. 5.

The described solution 500 is hosted by the enterprise 510. The figure shows the logical flow from the submission of a request to the end result, viewing the rendered Visual Document.

The data being visualized belongs to the customer 512 and the submitted request is unknown to the entity running the visualization system 500.

The controlling entity, integrators and customers may wish to have summaries of technical performance data (usage patterns, errors etc) sent from the operational system back to the integrator or controlling entity.

The system 500 has access to the data in a EDW 505. The system utilizes a request queue 515 to control requests from a corporate network 510. These requests are forwarded to a document controller 520. The document controller 520 accesses both the EDW 505 and reads visual designs and BPD metadata services 525, as well as data packages metadata services 530.

The system described thus enables various methods to be performed. For example, data is transformed into visually interpretable information. The visually interpretable information is in the form of visual representations that are placed within one or more visual documents.

Figure 6A:
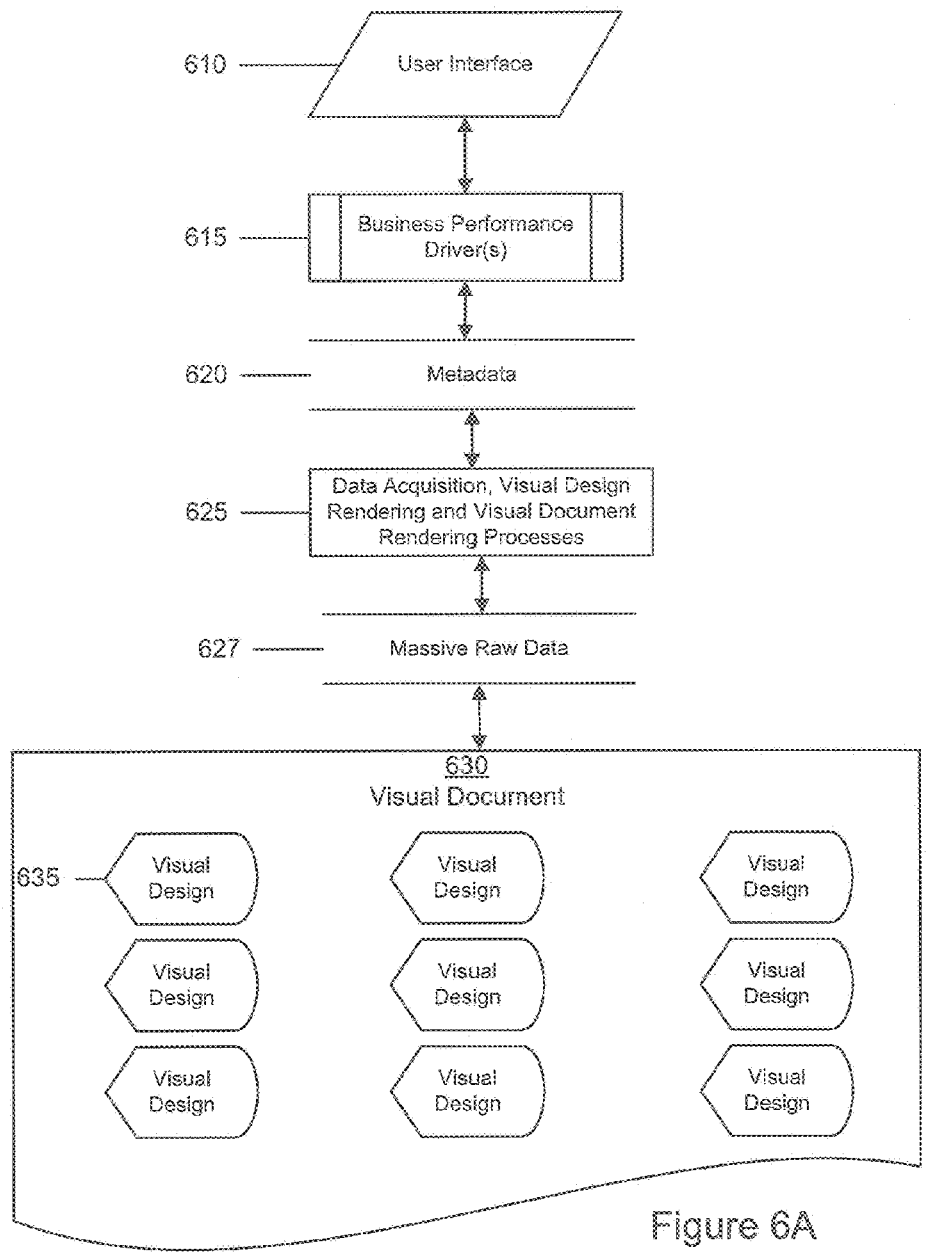
FIG. 6A shows a general data flow diagram according to an embodiment of the present invention.

FIG. 6A shows a general data flow diagram for the described system.

The User Interface 610 allows the user to define BPD's 615 in terms of raw data 627, which become the focus of the Visual Document 630.

Further, the User Interface 610 allows the user, through automated expert help, to create the Metadata 620, the most appropriate Visual Designs 635 that make up the Visual Document 625 in order to provide detailed analysis of data related to the BPD 615. The data acquisition, visual design rendering and visual document rendering processes utilize massive amounts of raw data 627.

The Metadata 620 is used by the Processes 625 to optimize the acquisition of the appropriate Data 627, processing of the data into useful information, and to optimize the creation and rendering of the Visual Designs 635 and the Visual Document 630 that contains them.

This method includes the steps of providing comprehensive yet easy to understand instructions to an end user that has accessed the system and the visual design application. The instructions assist the end user in obtaining data associated with a theme, wherein the theme may be focused on objectives that have been derived from the data. The objectives may be business objectives, for example. In this way, the system guides a user carefully through the many choices that are available to them in creating the visual representations, and the system automatically tailors its instructions according to not only what the user requires, but also according to the data that is to be represented. The system focuses on providing instructions to enable a visual representation to be created that will enable an end user to more effectively understand the data that has been collated.

Further, the instructions assist the end user in determining one or more summaries of the obtained data that enable the end user to understand the theme, as well as organizing the determined summaries into one or more contextual representations that contribute to the end user's understanding of the theme.

Further, instructions are provided that assist an end user in constructing one or more graphical representations of the data, where each graphical representation is of a predefined type, as discussed in more detail below, and includes multiple layers of elements that contribute to the end user's understanding of the theme.

Finally, instructions are provided to assist an end user in arranging the produced multiple graphical representations in a manner that enables the end user to understand and focus on the theme being represented as well as to display or print the organized graphical representations. The system assists in the organization or arrangement of the representations, elements thereof, within the visual document so as to ensure certain criteria are met, such as, for example, providing a suitable representation in the space available, using the minimum amount or volume of ink to create the representation, and providing a suitable representation that depicts the theme in a succinct manner, or visually simplistic manner.

The data being processed to create the graphical representations may be particularly relevant to the theme being displayed, disparate information or indeed a combination of relevant and disparate information.

There are multiple types of graphical representations that may be included within the visual document. The types are discussed in more detail below and include a hierarchical type, a spatial type, a virtual type, a classical type, a navigational type, a temporal type, a textual type, a structural type, a pivotal type, and an interactive type.

Further, the instructions may assist an end user in arranging the graphical representations in order to display high density data in a manner that conveys important information about the data, rather than swamping the end user with multiple representations that look impressive but do not convey much information.

In addition instructions may be provided to assist the end user in arranging the graphical representations to allow supplementary information to be added, where the supplementary information may be provided in any suitable form. Particular examples provided below depict the supplementary information being provided in subsequent visual layers that overlay the graphical representation. Alternatively, or in addition, supplementary information may include additional elements to be displayed within a single layer of the representation, for example, in the form of widgets.

Figure 6B:
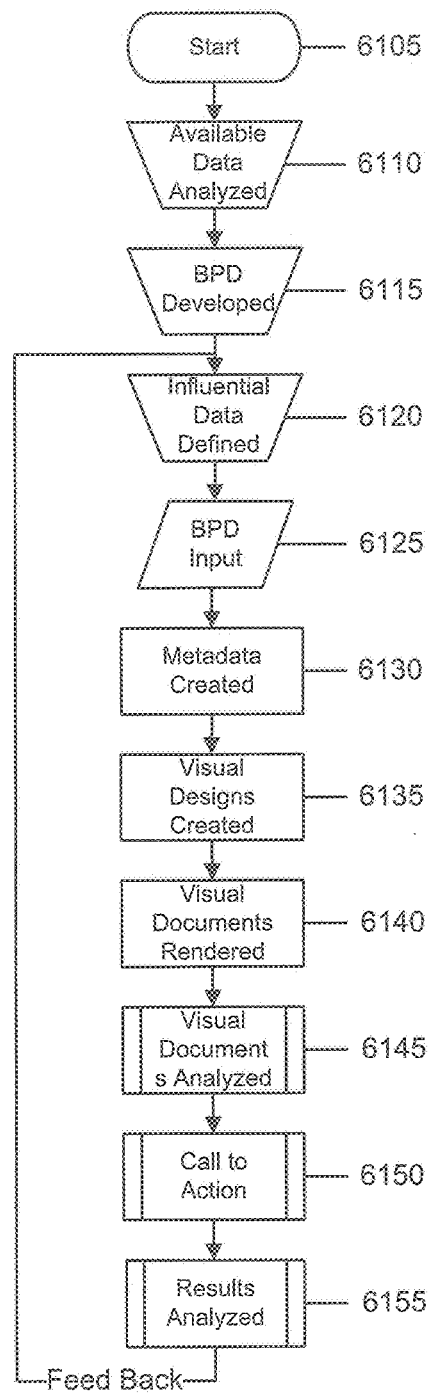
FIG. 6B shows a flow diagram according to an embodiment of the present invention.

FIG. 6B shows a flow diagram according to this embodiment of the invention.

Step 6105: Process Starts. User decides to manage the business.

Step 6110: Available data is identified and analyzed.

Step 6115: Business Process Drivers (metrics defined in terms of the data to indicate a meaningful measurement within a business area, process or result).

Step 6120: Data influencing the BPD metrics are identified.

Step 6125: BPD's are input into a computer system

Step 6130: BPD is categorized and appropriate metadata describing it is generated.

Step 6135: Visual Designs to display the influential data are created.

Step 6140: Visual Designs are aggregated into Visual Documents and rendered. Adjustments are made based on the freshness of all components (e.g., BPD, available data).

Step 6145: Visual documents are analyzed by the end user.

Step 6150: The end user decides on and implements actions based on the analysis in 6145.

As touched on above, business performance drivers (BPDs) are used to enable more efficient data analysis so as to produce accurate and relevant visual representations of the data. A BPD is a form of advanced business measure wherein additional information is included within the BPD that enables the system using the BPD to understand how to manipulate the BPD. That is, one or more intelligent attributes are included with the business measure to form the BPD, where those attributes reference or include information on how the BPD is to be processed or displayed. The form of processing and display may also be varied according to the device type or media upon which the business measures are to be displayed.

The attributes are attached to the business measure by storing the BPD in the form of a mark up language, such as, for example, HTML or XML. It will however be understood that any other suitable format for storing the BPD may be used where the attributes can be linked to the business measure.

In the example of HTML, the attribute is included as a tag. One such example would be to include the data or business measure within the body of the HTML code and follow the business measure with a tag that references the attributes, or dimensions, associated with that business measure.

Further, the attributes may also be modified or deleted, or indeed new attributes added, during or after the processing of the BPD so that the attributes are maintained, or kept up to date, bearing in mind the requirements of the entity using the BPD to visualize their data.

The business performance drivers, or measurable business objectives, are identified in order to create graphical representations of the business objectives, where those representations are placed within a visual document. A business objective may be, for example, a metric associated with a business.

Instructions are provided by the system to the end user, in order to assist the end user in establishing multiple business objectives as functions of available metrics, as well as assisting the user in organizing the business objectives into a contextual form that contributes to the end user's understanding of the business objectives.

Further, instructions are provided to assist the end user in constructing one or more graphical representations of the business objectives, where each graphical representation is of a predefined type, as mentioned above and described in more detail below. Further, each graphical representation includes multiple layers of elements that contribute to the end user's understanding of the business objective.

The elements within the graphical representation may include, for example, a shape, position, color, size, or animation of a particular object.

Instructions are also provided by the system to assist the user in arranging multiple graphical representations in a suitable manner that enables the end user to understand and focus on the business objectives being represented.

Finally, the end user is also assisted with instructions on how to display the organized graphical representations.

The following section describes a method of creating a visual representation of data in the form of a visual design.

The method includes the steps of the system providing instructions to an end user to assist the end user in constructing multiple graphical representations of data, where each graphical representation is one of a predefined type, as defined above and explained in more detail below, and the graphical representation includes multiple layers of elements that contribute to the end user's understanding of the data The system also provides instructions to an end user that assist the end user with arranging multiple graphical representations of different types within the visual representation in a manner that enables the end user to understand and focus on the data being represented, as well as providing instructions to assist the end user in displaying the visual representation in a suitable manner.

The visual representation may be displayed in a number of different ways, such as on a color video screen or a printed page. The information that is forwarded to the display device to create the visual representation may differ according the type of display device so that the visual representation is produced in the best known suitable manner utilizing the advantages of the display device, and avoiding any disadvantages.

The data being displayed may be based on a measured metric or an underlying factor that affects a metric.

The elements within the graphical representation may include a shape, position, color, size or animation of a particular object.

Although a single visual document may include only one type of graphical representation, either in the form of multiple graphical representations or a single representation, there will also be situations where multiple types of graphical representations may be organized within a single visual document in order to convey different aspects of the data, such as, for example, temporal as well as spatial information. The inclusion of different types of graphical representations within a single document can provide an end user with a better understanding of the data being visualized.

Further, the single visual representation may be arranged to be displayed as an image on a single page or screen. This may be particularly useful where space is at a premium yet the user requires the visual representation to be provided in a succinct manner. For example, the user may request certain information to be displayed in a visual representation on a single mobile telephone display, or a single screen of a computer display, in order to show a customer or colleague the results of a particular analysis without the need to flick between multiple screens which can result in confusion, a waste of energy and ultimately a loss of understanding of the visual representations.

The same issue applies to printed representations, where the result of the system enabling a user to arrange a single representation, which may include multiple elements or layers, on a single page not only succinctly represents the data being analyzed but also saves the amount of paper being printed on and the amount of ink being used to print the document.

Further, the amount of ink required for a visual representation may be further reduced by providing instructions to the end user in a manner that directs them to control and use white space in a representation in an efficient manner so as to reduce the requirement of ink.

Multiple types of graphical representations may be merged together within a single visual document, or representation.

As mentioned above, instructions can be provided by the system to assist the end user in adding supplementary information to the visual representation, and the supplementary information may be provided in layers within the representation.

Visualization Framework

The following description provides the visualization framework that will support embodiments of the present invention. The description includes an overview of the importance of Visual Design including a brief historical recount of a world-recognized leading visualization. The description also sets out the Visual Design classifications for the described solution.

It will be understood that the Visual Design examples described in this section are examples for illustrative purposes to identify the concepts behind how the visualization is produced. Therefore, it will further be understood that the concepts described can produce visual designs different to those specifically described. The Visual Design examples shown are also used to help the reader understand the narrative describing the Visual Designs.

The system described is specifically adapted to create actual specific visualization designs relevant to selected vertical and horizontal industry applications being deployed.

A vertical industry application is one that is associated with a solution directed at a specific industry, such as, for example, the entertainment industry. In this example, BPDs relevant to that industry are created, such as rental patterns of movies over different seasons.

A horizontal industry application is one that is associated with solutions across multiple industries. For example, the BPD may be based on CRM analytics, which applies across a whole range of different industries.

Design is now a fundamental part of almost every aspect of how people live work and breath. Everything is designed from a toothbrush to every aspect of a web site. Compare visual design to architectural design—in both cases anybody can draw quite complex pictures. The resulting pictures could have stimulating and well drawn graphic elements. In both cases, the question is why does the world need designers? Exploring this question more deeply one can ask—does it make such a difference to how one perceives and understands a design when it is made by a professional rather than an amateur?

The trend in business intelligence is to design tools to provide flexibility and leave the world of visual design to the amateurs. Stephen Few comments in Information Dashboard Design[v] that "Without a doubt I owe the greatest debt of gratitude to the many software vendors who have done so much to make this book necessary by failing to address or even contemplate the visual design needs of dashboards. Their kind disregard for visual design has given me focus, ignited my passion, and guaranteed my livelihood for years to come."

Visual Designs within the described framework are well thought through in how the data is displayed. The described system allows good information visualization design concepts to be captured and delivered back to users as Visual Documents using unique data processing and analysis techniques.

Visual Designs

Method or Visual Design Classifications

According to this embodiment, ten Visual Design types are defined and incorporated into the described system. It will be understood that additional Visual Designs may be further defined including the creation of certain examples and actual Visual Designs for specific industry applications.

The visual design types include:

Hierarchical

Temporal

Spatial

Textual

Virtual

Structural

Classical

Pivotal

Navigational

Interactive

The following describes a method for the assessment of Visual Design quality. In assessing the quality of a Visual Design the following factors should be considered:

- Alternative approaches—To assess the capability of a Visual Design it is important to contrast it with other visualization methods. In particular one should compare the visual design to a classical graph or table of numbers. This comparison is important as many data visualizations add considerable graphic weight but little informational value.
- Visual simplicity—Looking at a visualization should not overload the mind. The simplicity of the visualization is important as it enhances interpretation and allows common understanding without training. Some visualizations require considerable training to be applied. In general, the described solution will not use these visual designs.
- Data density—the density of data in a visualization is a critical measure of its overall value. Higher density visualizations, if successful in maintaining their simplicity, have considerable potential to increase the flow of information to end users.
- Volume of ink used—Is the visual design using negative space to show key information? This use of negative space allows lower volumes of ink to be used while showing the same or higher density of information. In addition, ink required is generally reduced as the number of "views" or pages of data is reduced to convey the same volume of data.
- Capability to be illuminated with detail—In the end, data visualization becomes information visualization when the specific details are shown. The ability of a visualization to hold detailed information in specific places, often achieved with labels, is a key element in determining its value as an information visualization.

Visual Design Layers

Figure 7:
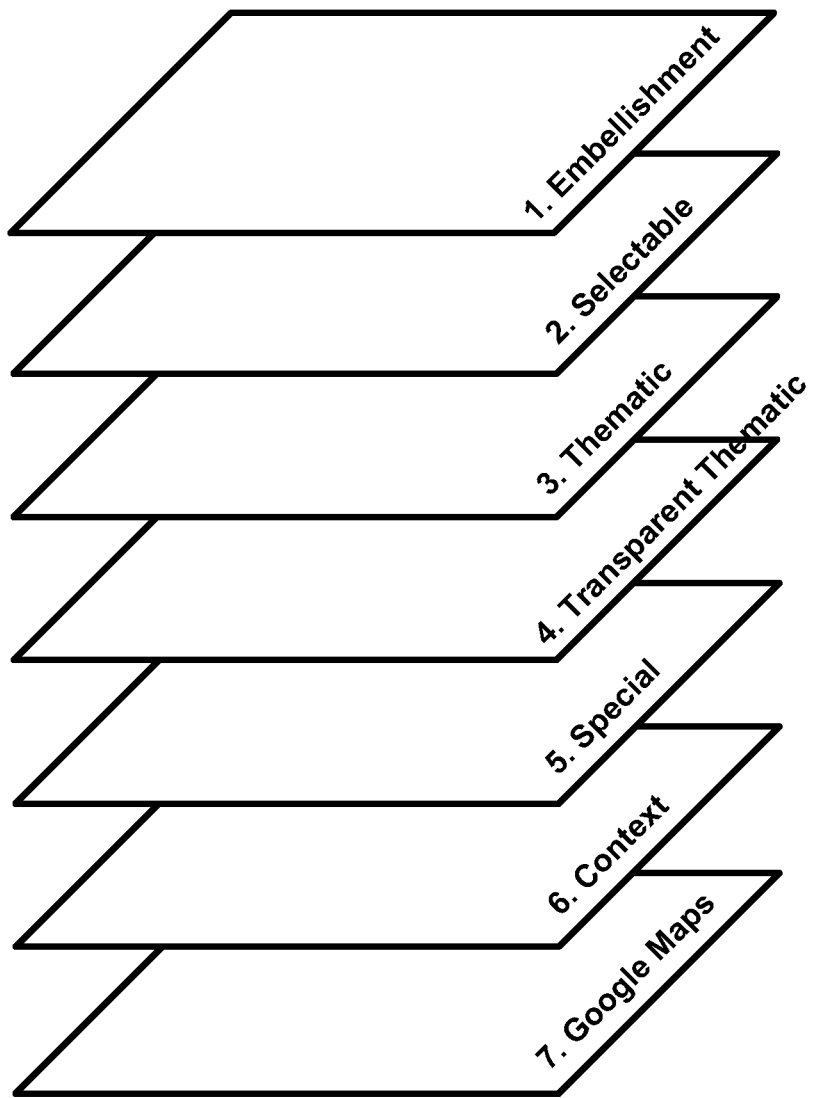
FIG. 7 shows the concept of layers according to an embodiment of the present invention.

There are seven defined Visual Design Layers which are set out diagrammatically as shown in FIG. 7. Other visual design layers may be added as appropriate.

These seven Visual Design Layers are described in the following table:

| Visual Design Layer Type | Description |
| --- | --- |
| 1. Embellishment Layers | Embellishment Layers have labels, symbology and/or other detailed information that is used to illuminate information that is displayed in the lower layers. The overlay can also include controls such as progress bars or spark-lines. |
| 2. Selectable Layers | Selectable Layers are interactive and consist of items that can have associated data. On a retail spatial map it includes store locations as they have associated data. Selectable Layers are typically not obscured by thematic treatments. |
| 3. Thematic Layers | Thematic Layers overlay colors or heatmaps on Special Layers. These thematic treatments become the core visual impact of the final Visual Document. |
| 4. Transparent Thematic Layers | Transparent Thematic Layers are very similar to Thematic Layers (in fact are an alternative). The only difference is that they are graphically merged using a transparent overlay. For example, this kind of layer is necessary to overlay heatmaps on maps.google.com. |
| 5. Special Layers | Special Layers construct the structure of the data. Specifically the Special Layer understands how to automatically draw the data so that other thematic treatments can be applied. Special Layers include mundane layers such as layers of polygons. |
| 6. Context Layers | These are the lowest level of the visualization; they include background maps and other contextual information. |
| 7. Context Map Layers | This is a type of context layer that is rendered from a map such as Google ™ Maps, Yahoo ™ Maps etc. This may be a road map, satellite map or any other map. It is past as a set of tiled images and as such can only be used as a Context Layer. Typically, a Transparent Thematic Layer will be used to display thematic data on a context map layer. |

In terms of the Special Layer, two examples of Special Layers are set out below:

A. Classic Example of Special Layer: Voronoi Diagram Source: Wikipedia[vi]

In mathematics, a Voronoi diagram, named after Georgy Voronoi, also called a Voronoi tessellation, a Voronoi decomposition, or a Dirichlet tessellation (after Lejeune Dirichlet), is a special kind of decomposition of a metric space determined by distances to a specified discrete set of objects in the space, e.g., by a discrete set of points.

In the simplest and most common case, in the plane, a given set of points S, and the Voronoi diagram for S is the partition of the plane which associates a region V(p) with each point p from S in such a way that all points in V(p) are closer to p than to any other point in S.

A Voronoi diagram can thus be defined as a Special Layer, where a set of polygons are generated from a set of points. The resulting polygon layer can then be subjected to thematic treatments, such as coloring.

B. Non Traditional Example of a Special Layer: Calendar

A calendar can be generated as a Special Layer for display of a temporal visual document. This Special Layer would require a 'start date' and an 'end date', most other information regarding the nature and structure of the Calendar could be determined automatically. The thematic layers would then use the structure of the calendar as a basis for thematic treatments such as coloring and contouring.

In an example from ENTROPIA[vii] a calendar is shown that can be created into a spiral. The structure and layout of this spiral will be the subject of considerable design discussions by information designers focused on issues such as aesthetics and clarity of information. The result of this discussion is a visual design of a spiral calendar Special Layer. This Special Layer can then be used for thematic treatments such as coloring.

Embodiments of the present invention are described herein with reference to a system adapted or arranged to perform the herein described methods for producing a dimensionally reduced visual representation.

In summary, the system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions represent the various methods of performing the invention as described herein. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

The system is arranged to be in communication with external data storage systems or devices in order to retrieve the relevant data.

The data provided as an input to the system may be of any suitable type of data, for example, real world data including, but not limited to, gaming or gambling data associated with a gaming environment such as a casino, event data, test or quality control data obtained from a manufacturing environment, business data retrieved from an accounting system, sales data retrieved from a company database, etc. All this data may be received by the system in real time in a cache memory or may be stored in a more permanent manner.

As previously discussed in the above mentioned provisional patent application, an improved method of graphically representing high dimensional data has been developed as follows.

According to specific embodiments of the invention, various methods are provided that use the referenced system to allow the user to display higher dimensional data in a lower dimensional plot. The methods may for example be used to display 3D data in a 2D representation but is not limited to this, and may be used to display any suitable higher dimensional level of data in a lower dimension plot. The displaying (visual representation) of information may be via any suitable output device, such as a display device, printing device or any other suitable device that can be used to visually represent information to a user. The system described within the reference and herein arranges the data in a suitable format for it to be rendered in a correct manner prior to it being visualized in the chosen format.

In broad terms, the herein described methods involve ranking data based on one variable, while distributing data based on another variable. This enables multi dimensional data to be represented in fewer dimensions in a manner that allows a user to easily discern the context of the data.

Although the method may be applied by ranking data based on a first variable and distributing data based on a second variable, the following example shows a method being applied to data having 3 variables V1, V2, and V3. Wherein the data is stored in a database which has N records; it is assumed that there are no missing values for any of the three variables.

Figure 8:
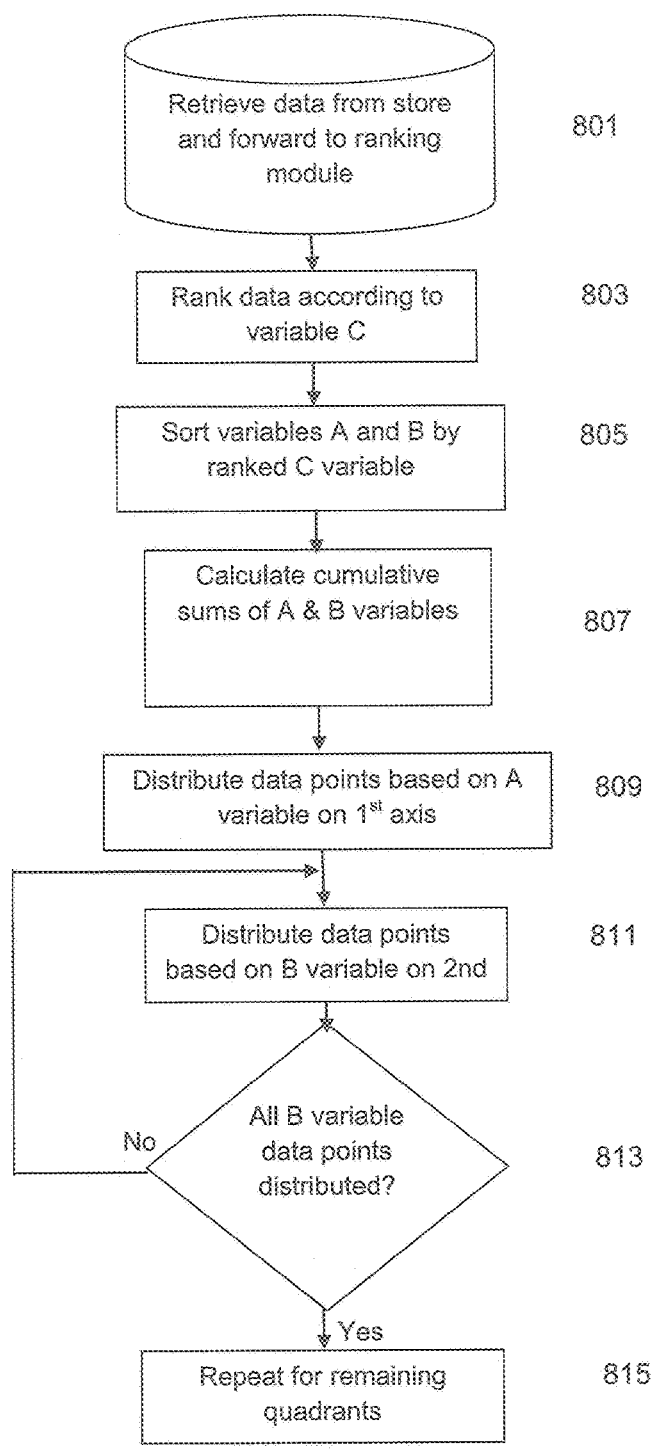
FIG. 8 shows a flow diagram of a method according to an embodiment of the present invention.

The method can be carried out using the following steps, as indicated in FIG. 8:

The data is retrieved from a data store in step 801.

1) In step 803, rank a variable, such as the third variable V3.

2) In step 805, sort the remaining two variables, such as the first two variables V1 and V2, each by the ranked variable V3.

3) In step 807, calculate cumulative sums of V1 and V2 in the order in which they have been sorted in step 2.

Figure 9A:
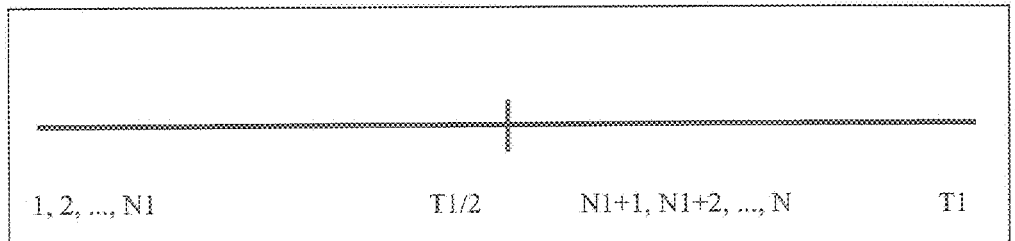

4) Let T1=total of V1. Use the cumulative-sum column of V1 to split the N sorted values of V1 into two approximately equal halves. In other words, find an integer N1 between 1 and N so that the sum of values of V1 in rows 1, 2, . . . , N1 approximately equals T½, as shown in FIG. 9A. Thus, data points are distributed along the horizontal axis in step 809, as shown in FIG. 9A, while retaining the ranking information determined in step 1 above.

FIG. 9A shows splitting of N records into two parts so the sum of V1 in each part is at least approximately equal to T½.

Figure 9B:
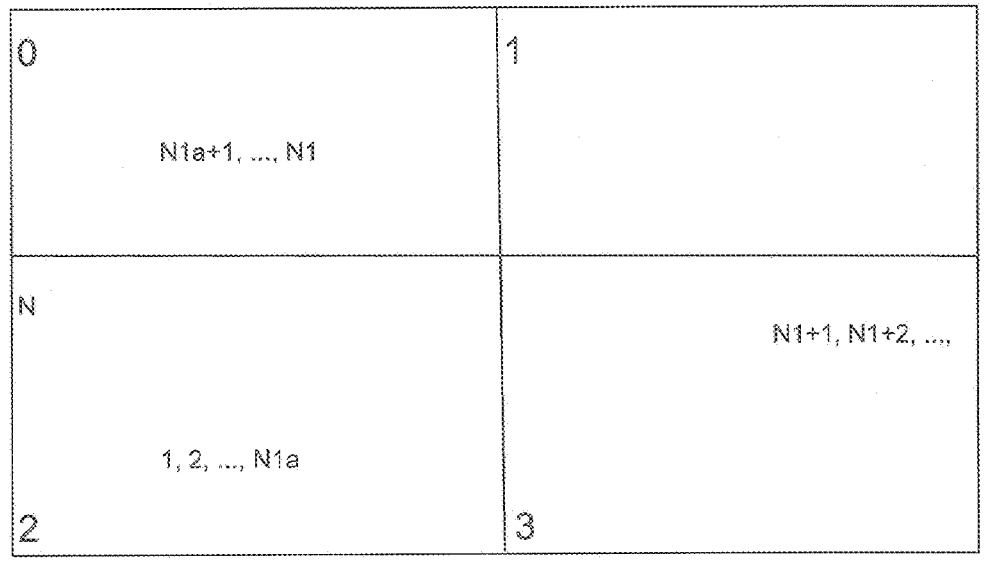

5) Calculate the sum of V2 values in the rows 1-N1; let T1a be this sum. Next split the records 1, 2, . . . , N1 into two parts so that the sum of V2 in each part is approximately T1a/2. In other words, find an integer N1a between 1 and N1 such that the sum of V2 for the records 1, 2, . . . , N1a approximately equals T1a/2, and the sum of V2 for the records N1 a+1, . . . , N1 approximately equals T1 a/2 (as shown in FIG. 9B). Thus, data points are distributed along the vertical axis in step 811, as shown in FIG. 9B, while retaining the ranking information determined in step 1 above.

FIG. 9B shows splitting of N1 records 1, 2, . . . , N1 into two parts so the summed totals of V2 in each part are equal or approximately equal.

6) In step 813, repeat Step 5 above for the remaining V2 records N1+1, N1+2, . . . , N. The records 1, 2, . . . , N have therefore been placed in 4 quadrants, labeled 0, 1, 2, 3 in FIG. 9B.

In step 815, steps 4-6 above are then repeated for each of the 4 quadrants 0, 1, 2, 3 so that each of the four quadrants is further split into four quadrants, as shown in FIG. 9C.

FIG. 9C shows splitting of each quadrant 0, 1, 2, 3 into four quadrants.

This process may be iterated further to divide the quadrants into smaller and smaller quadrants. This iteration may be continued until each quadrant contains only a single data point.

In more general terms the "ranking function", such as that used for the variable V3, can be any sorting function that is deterministic in nature. For example, the variables may be sorted to minimize the statistical distance between the variables, or items associated with the variables. Alternatively, the variables may be sorted in association with more than one variable. Also, the results of a principal components analysis, or similar function, may be used to rank the variables. It is also possible to use a further variable, V4, which may be used to rank a first axis while V3 ranks a second axis.

In more general terms the "splitting function", such as that used for the variables V1 and V2, can be replaced by any function or set of functions or system of equations that generates a value for the set of items. For example the function might be a log of the total values, or a polynomial function.

An example is where V3 is frequency, V4 is frequency and V1 and V2 are profit. In more general terms the splitting function could be used to split the whole axis into any fraction. For example, the splitting function may use a higher number than 2 (any value is acceptable). Therefore, the axis could be split into multiple portions greater than 2, such as in 10ths, 3rds etc. The number of splits used will follow the same basic rules as defined herein but the value is allocated according to the higher number. Alternatively, any other method of deterministically splitting the items into buckets of equal or approximately equal but ranked values could be used.

This iteration process may create some regions which do not contain data points. Such empty regions may be used to display further information. For example, an empty region could be used to display visual designs of any suitable kind, including any of the various visual designs disclosed or referenced in this specification. The visual design used for an empty region may be of a type different to the particular design described in this example.

A further processing step may be applied to spread the data from source points into surrounding grid cells, this optional step reduces the accuracy of the individual point data but increases the accuracy of the overall image display. One example of the spread function is to half the data from the singleton cell and to create a pseudo point in the adjacent and empty cell with a value equal to half of the total.

In general, data is arranged in n dimensions. The "quadrants" are more generally n-dimensional regions. The data may have n+1 or more variables. The ranking and distribution steps can be applied to any number of axes.

Where n is greater than two, it may be necessary to apply any suitable filtering or dimension reduction technique (such as a projection or a section) to the arranged data before the data can be displayed. This allows higher dimensional data to be displayed in two dimensions. The filtering or dimension reduction process can be chosen to maximize the display of information of interest to a user. In particular, the filtering or dimension reduction process can be designed to maximize display of particular variables of interest. This process may be an integrated part of the method described herein. It can results in a reduction of the data to a point where the values can be displayed.

Principal component analysis (PCA), as described by Wikipedia, involves a mathematical procedure that transforms a number of possibly correlated variables into a smaller number of uncorrelated variables called principal components. The first principal component accounts for as much of the variability in the data as possible, and each succeeding component accounts for as much of the remaining variability as possible. Depending on the field of application, it is also named the discrete Karhunen-Loève transform (KLT), the Hotelling transform or proper orthogonal decomposition (POD).

PCA was invented in 1901 by Karl Pearson. Now it is mostly used as a tool in exploratory data analysis and for making predictive models. PCA involves the calculation of the eigenvalue decomposition of a data covariance matrix or singular value decomposition of a data matrix, usually after mean centering the data for each attribute. The results of a PCA are usually discussed in terms of component scores and loadings (Shaw, 2003).

PCA is the simplest of the true eigenvector-based multivariate analyses. Often, its operation can be thought of as revealing the internal structure of the data in a way which best explains the variance in the data. If a multivariate dataset is visualised as a set of coordinates in a high-dimensional data space (1 axis per variable), PCA supplies the user with a lower-dimensional picture, a "shadow" of this object when viewed from its (in some sense) most informative viewpoint.

PCA is closely related to factor analysis; indeed, some statistical packages deliberately conflate the two techniques. True factor analysis makes different assumptions about the underlying structure and solves eigenvectors of a slightly different matrix.

Therefore, if there are k variables in the data on which PCA is performed, then k PCs (principal components) can be computed. All k PCs together explain 100% of variability in the data. If p1, p2, . . . , pk are proportions of variability in the data explained by PC1, PC2, . . . , PCk, respectively, then $p1 \geq p2 \geq \ldots \geq pk$, and $p1+p2+ \ldots +pk=1$.

Data may be displayed so as to: provide a "complete view" of all variables; provide a partial view which provides complete information for selected variables; or provide a partial view which provides partial information for selected variables. Additional variables may be displayed over the two dimensional plot.

For example a supplementary information map such as a heat map or contour map could be applied. Alternatively (or even in addition to an information map) variables could be displayed using numbers appropriately positioned over the plot. This overlay can be of an additional variable, for example, profit. This will enable visual data discovery based on the herein described method in terms of the additional metric (profit).

It has been determined through analysis that all the different values for the splitting function produce essentially the same location for the data points and that using a splitting order of 2 is computationally most efficient. In particular, where the allocation within the grid is run in parallel across various threads, processors or services using a binary splitting function provide for the maximum amount of parallel processing.

Example

TABLE 1

| | | data | | |
|---|---|---|---|---|
| Customer No. | Total revenue | No. of visits (ranking) | Profit | Items purchased (ranking) |
| 50 | 5000 | 1 | 1000 | 2 |
| 38 | 3000 | 2 | 2000 | 9 |
| 40 | 5000 | 3 | 1000 | 7 |
| 99 | 6000 | 4 | 500 | 10 |
| 98 | 2000 | 5 | 1000 | 8 |
| 103 | 1000 | 6 | 500 | 6 |
| 94 | 12000 | 7 | 1000 | 5 |
| 81 | 9000 | 8 | 1000 | 3 |
| 73 | 10000 | 9 | 100 | 4 |
| 68 | 11000 | 10 | 500 | 1 |

Table 1 shows a set of data values. The customer no. column shows a number identifying a particular customer. For each customer, revenue and profit data is provided. The customers have also been ranked with respect to both a number of visits and a number of items purchased.

Figure 9E:
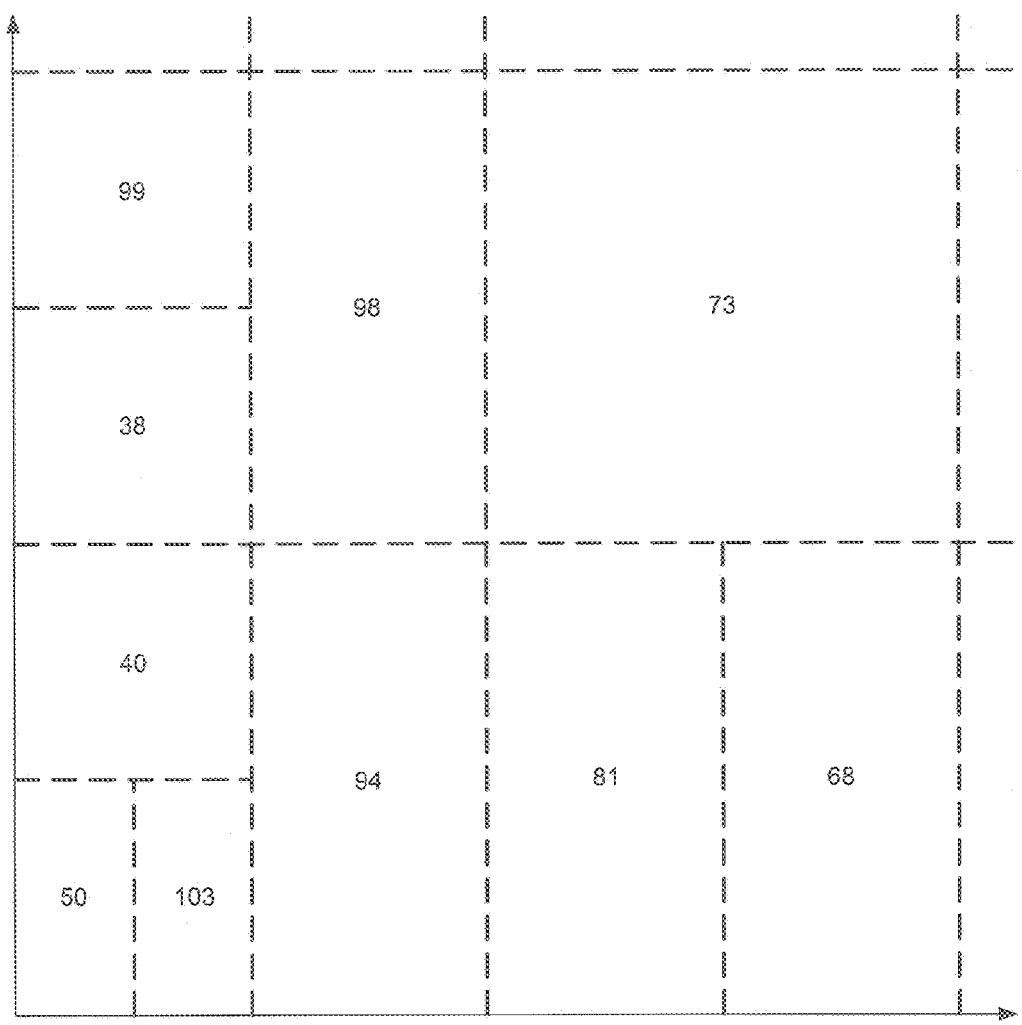

FIG. 9E shows a two dimensional display of the data from Table 1.

The data values are ranked with respect to the x axis using the number of visits variable. The data values are distributed along the x axis using the revenue variable.

The data values are ranked with respect to the y axis using the number of items purchased variable. The data values are distributed along the y axis using the profit variable.

The summed value of all the revenue data values is 64000. The summed value of all the profit values is 8600.

The position of each data point in FIG. 9D is indicated by a number, corresponding to the customer number of Table 1. In this example, the position of each data point has been determined as follows.

From Table 1 we already know the rankings of data points with respect to both the number of visits and number of items purchased variables.

Step 1: The system splits (or divides) the customers along the X axis of the visual representation so that the sum of the total revenue for customers before the split is either equal to 50% of the total, or greater than and close to 50% of the total. That is, the system monitors the cumulative revenue values of the ranked customers and splits the ranked customers after the first cumulative value that is equal to or greater than 50% of the total cumulative value. This is to ensure that the customers are split as evenly as possible, such that each split includes substantially half the total revenue.

For example, referring to the following table 2 of ranked cumulative revenue values for customers 50, 38, 40, 99, 98, 103, 94, 81, 73 and 68 the split would occur after customer 94, so that all customers in the table above and including customer 94 are positioned on the left hand side of the split, and customers 81, 73 and 68 are positioned on the right hand side of the split. That is, the total revenue is 64000, 50% of this is 32000, and 34000 (the cumulative value when reaching customer 94 in the ranking) is the first cumulative value that is greater than 50%

TABLE 2

| Customer ID | Revenue (per customer) | Rank (No of visits) | Cumulative Revenue value |
| --- | --- | --- | --- |
| 50 | 5000 | 1 | 5000 |
| 38 | 3000 | 2 | 8000 |
| 40 | 5000 | 3 | 13000 |
| 99 | 6000 | 4 | 19000 |
| 98 | 2000 | 5 | 21000 |
| 103 | 1000 | 6 | 22000 |
| 94 | 12000 | 7 | 34000 |
| 81 | 9000 | 8 | 43000 |
| 73 | 10000 | 9 | 53000 |
| 68 | 11000 | 10 | 64000 |

Alternatively, to ensure each split includes substantially half the revenue, the split may be made before the first cumulative value that is greater than 50% of the total cumulative value. Using the same table above, the split in this example would occur after customer 103, such that customer 103 and all other customers above it are positioned on the left hand side of the split and customers 94 and below are positioned on the right hand side of the split. That is, the cumulative revenue value for ranked customer 94 is 34000, the first cumulative value greater than 50% (32000), and so the split occurs before this, i.e. above customer 103.

As a further alternative, to ensure each split includes substantially half the revenue, the system may determine where to make the split by determining which of the cumulative revenue values is closest to 50% of the total, and splitting the ranked customers at that revenue value so that the split occurs after or before the determined revenue value. Using the same table above, the system calculates that 50% of the total revenue value is 32000, and determines that the cumulative value closest to this is 34000. Therefore, the system may split the customers either before or after the ranked customer 94 where the cumulative value is closest to 50%.

That is, the split or division point is determined by looking for a total cumulative revenue value that is equal to or close to 50% of the total (32000) in the ranked customers and then allocating the ranked variables to the lower half of the split, with the remaining variables placed in the upper half of the split.

As explained above using the first example, the split point follows customer 94, where the sum of the revenues up to this customer is 34000 and prior to this customer is 22,000. Therefore, customers 50, 38, 40, 99, 98, 103 and 94 are positioned on the left hand side of the split, while customers 81, 73 and 68 are positioned on the right hand side of the split.

Step 2: The system splits the customers positioned on the left hand side of the visual representation along a different axis to step 1 by using a different ranking (e.g. items purchased) to that used in step 1 and by using a different accumulated variable value (e.g. accumulating profit values in the ranked order, rather than accumulating revenue values).

That is, the system ranks the customers based on the number of items purchased so that the value of the accumulated profit for the ranked customers before the split is equal or close to 50% of the total for the left hand side with the remaining ranked customers positioned after the split. Any of the described methods in step 1 above may be used to determine where the split occurs. In this example, customers 50, 94, 103 and 40 are positioned in the lower left quadrant, and customers 98, 38 and 99 are positioned in the upper left quadrant.

Step 3: The system splits the customers positioned on the right hand side of the visual representation using any one of the same methods as the left hand side customers were split in step 2. This will result in customers 68 and 81 being placed in the lower right quadrant and customer 73 being placed in the upper right quadrant.

FIG. 9D shows an example of the customer locations in the quadrants of the visual representation following step 3.

Step 4: The system splits the customers in the lower left quadrant of the visual representation into left and right portions (within the lower left quadrant) using one of the same methods described above based on ranking 1 (No. of visits). Therefore, customers 50, 40, 103 are placed in the left portion, and customer 94 is placed in the right portion.

Step 5: The system splits the customers in the left portion created in step 4 into upper and lower portions (within the left portion) using one of the same methods described above based on ranking 2 (Items purchased). Therefore, customers 50 and 103 are placed in the lower portion, and customer 40 is placed in the upper portion.

Step 6: The system splits the customers in the upper left quadrant using one of the same methods described above based on ranking 1 (No. of visits). Therefore, customers 38 and 99 are placed in the left portion of the upper left quadrant and customer 98 is placed in the right portion of the upper left quadrant.

Each portion or region now includes at most two customers. It is possible to make a final split of those regions (here the system simply observes the relative rankings of the two numbers to make the final split). In the example in FIG. 9A, customers 38 and 99 are further split according to the ranking 2 (Items purchased), and customers 50 and 103 are further split according to ranking 1 (No. of visits).

This gives the distribution of data points shown in FIG. 9E.

It can be seen that the splitting of the customers along the x axis of the visual representation is based on a first single ranking criteria (e.g. Number of visits), whereas the splitting of customers along the y axis of the visual representation is based on a second different single ranking criteria (e.g. Number of items purchased).

The display area as shown is divided by dashed lines into a number of regions. Regions of equal width contain approximately equal proportions of the total revenue. Similarly, regions of equal height contain approximately equal proportions of the total profit.

The left hand regions contain a proportion of revenue from the customers who visited least often (since this is how data is ranked). The right hand regions contain a proportion of revenue from customers who visited most often.

Similarly, the upper regions contain a proportion of profit from customers who bought the greatest number of items. The lower regions contain a proportion of profit from customers who bought the least number of items.

In summary, in this described embodiment, each data point (customer) is ultimately positioned within its own region or area of the visual representation as shown in FIG. 9E. The positioning of the data point is based on a first ranking variable and the splitting of a first distribution variable along one axis, and a second ranking variable and the splitting of a second distribution variable along a second axis.

It can be seen in the examples above that the variables (e.g. number of visits or items purchased) used to rank the data set (e.g. customers) being visualized along an axis are different to the variables (e.g. profit or revenue) that are used to split or distribute that same data set along the same axis.

Further, although the herein description uses the terminology x and y axes, it will be understood that the y axis is not a dependent axis. That is, the y axis is not used to record a variable (y) that is dependent on another variable (x). Each axis is used to rank and split (or distribute) independent variables.

In a further embodiment the variable being accumulated may be the same on each axis (e.g. accumulated revenue is determined for different ranking criteria on each of the x and y axis). In this case, each region displayed on the visual representation will contain an approximately equal proportion of the total of that variable. For example, in FIG. 9B, if the distribution or splitting of the customers along both the x and y axes is governed by a single variable (for example, revenue) then the quadrant 0 will contain approximately 25% of the revenue, as will each of quadrants 1, 2 and 3. Further division of the regions may be performed in this example, as described above.

The system may also display a further variable on the visual representation using a supplementary information map, such as a heat or contour map that is placed over the visual representation so it may be viewed with the information described above.

The distribution of the data points may respect the same ranking information or have different ranking information for both the x and y axes.

In one embodiment, a function may be determined for each axis where the function maintains the rank order of one metric for an item and respects the distribution of a second metric. This gives a unique position for each item on the axis. When applied to a two or three dimensional grid the result is a unique position for each item such that the sums of the values for the classification grid are equal. A contour heatmap, or three dimensional object overlay, then shows the density of the metric used for analysis.

Therefore, it can be seen that the herein described system may be used to automatically allocate or position one or a group of items, articles, objects, concepts, entities or things to or in a certain region or portion of a visual representation based on a number of variables associated with that item etc.

The herein described system may be used, for example, to monitor the quality of products coming off a manufacturing line where the different products are allocated a specific region on the visual representation based on rankings and splitting (distribution) variables from any number of different variables.

For example, the variables recorded during manufacturing and testing, as well as values obtained from sales and marketing data recorded in a database, may include mean time between failure (MTBF), mean time to failure (MTTF) or the like, cost to build value, profit margin, rank of popularity, number of items sold, number of return items, number of recalls etc.

By using the system herein described the products as a data set are positioned accordingly in a visual representation. It then becomes easier for a product manager to ascertain relevant information from the data visualization output by the system. For example, the data visualization may convey information to the product manager that indicates which of the higher profit, highly sought after products in the set are causing most or least problems. That is, the data visualization created by the system enables the product manager to note the position of the product data points in the representation and therefore identify where problems affecting profitability the most are occurring within the manufacturing environment.

It will be understood that the system herein described includes one or more elements that are arranged to perform the various functions and methods as described herein. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

Figure 10:
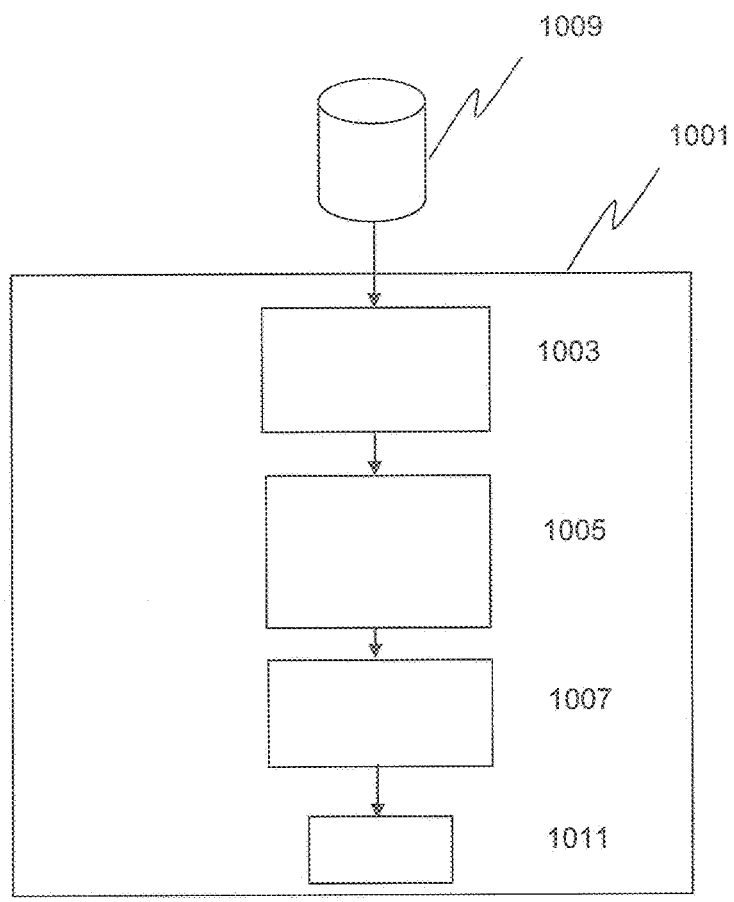
FIG. 10 shows a conceptual system diagram of a data visualization system according to an embodiment of the present invention.

According to this embodiment there is shown in FIG. 10 a conceptual system diagram of a data visualization system 1001 that is arranged to perform a method of arranging, in n dimensions, data points representing n or more variables.

Data associated with the data points is retrieved from a data storage module 1009 using a data retrieval module 1003. The data retrieval module 1003 is configured to enable the retrieval of data from the data storage module 1009, which is in communication with the data visualization system 1001. The data storage module may be any suitable type of data storage system. For example, it may be an enterprise data warehouse (EDW), a data mart, a database, a storage array or any other suitable device or groups of devices that can store data for later retrieval. Further, the data storage module may be a cache memory used to temporarily store incoming data captured in real time.

The system 1001 includes a data point ranking module 1005 that is arranged to rank a set of data points.

The ranking is carried out with respect to a first axis of a visual representation using a first variable associated with the retrieved data. For example, the first axis may be the axis commonly known as the x-axis or horizontal axis in a two dimensional axis system.

The system also includes a data point distribution module 1007 that is arranged to distribute the set of data points based on a second variable associated with the retrieved data. The data points are distributed by the data point distribution module along the same axis as the ranking. Further, the distribution of the data points is carried out by the data point distribution module in a manner that ensures the information relating to the ranking of data points determined in the ranking step above is retained.

In this embodiment, the system also includes a display module 1011 as an output module in order to visually represent the data points along the horizontal axis.

As an alternative to, or in conjunction with, the display module, further output modules may be provided to output the results of the ranking and distribution modules. That is, the raw data retrieved by the data retrieval module is analyzed and converted by the ranking and distribution modules to provide output data in a specific format. The output data is provided to the display and/or further output modules to enable a user to visualize the raw data in a manner that conveys more useful or hidden information that would otherwise be lost.

The further output module may be a printing device in communication with the described system to receive print control data so that representations of the data may be printed on any suitable print medium. Alternatively, the further output module may be an interface that enables the data output from the ranking and distribution modules to be interfaced with other data handling modules or storage devices.

The data point ranking module is further arranged to rank data points with respect to one or more further axes using one or more variables. For example, the further axis may be what is commonly termed the y-axis or vertical axis. Also, more than two axes may be used to rank and distribute data.

The ranking module may rank the data points using any suitable ranking methodology, such as a deterministic sorting function.

Further, the ranking module may rank the data points based on at least one of volume, importance, statistical ordering, statistical distance, quantity, or value of the data associated with the data points.

The data point distribution module is further arranged to distribute data points along these further axes while retaining information relating to the ranking of data points determined in the ranking steps described above.

The scale used along the axes used to represent the data points may be varied by the system. For instance, the maximum value allocated to any one axis may be defined by the data values for a particular variable. Alternatively, the system may define the maximum values along any axes by the sum of data values over a particular variable.

Through the use of the output module, the arranged data points, or at least a subset thereof, may be visually represented. In addition, the output module may be controlled by the system to visually represent supplementary information over the displayed arranged data sets as an overlay.

For example, the output module may visually representing the supplementary information in the form of a contour or heat map on top of the arranged data points to convey further information related to the data points.

Therefore, as described above, the data point distribution module is arranged to distribute the data points by dividing the data points between two or more regions in the visual representation. There may be n-dimensional regions created by the system for displaying the data points, where the data points represent n or more variables.

For example, the system may arrange the regions within the visual representation to convey information that is based on proportions of summed variables contained within the regions.

Further, the system is arranged to control the data point distribution module so that it can distribute data points within a region of the visual representation, by creating two or more sub-regions within the region and distributing data points between those sub-regions. The sub regions in the visual representation may then be divided further and the data points distributed within those further divided sub-regions until the representation is arranged to depict a maximum of one single data point within each of the divided sub-regions. Therefore, each data point resides in its own allocated region, and as such, each data point has a unique position in the visual representation that depicts specific information about the variables associated with that data point.

Further, through the distribution of the data points, each data point has a unique position along each axis of the visual representation determined through the operation of the ranking and distribution modules.

As there may be certain regions within the "grid" of sub-regions that do not contain a data point, these areas or regions may be used by system to visually represent supplementary information. For example, the system may control the display module to visually represent the supplementary information in the form of a heatmap. Other alternative types of supplementary information may also be displayed, such as, for example, widgets, static or dynamic objects. Further, different visual design types may be displayed as the supplementary information, such as geographical, temporal, hierarchical, spatial, virtual, classical, navigational, textual, structural, and interactive types.

Therefore, the data points being represented in the visual representation created by the system provide a complete view of information of interest, while minimizing the area or space in which the information is being displayed.

The system may also include a filtering module arranged to filter the data associated with the data points before displaying the data points or associated data on the visual representation.

In order to further minimize the number of dimensions in which the data points are being displayed, the system may also include a dimension reduction module that is arranged to apply any suitable type of dimension reduction technique to the data that is associated with the data points before arranging the data points to be displayed on the representation.

Also, the system may enable the user to selecting a set of data for visual representation, or enable a user to select a view of arranged data points, in order to maximize the visual representation of data or variables of interest associated with the data points. The selection may be monitored by the system by way of monitoring a pointing device in conjunction with a graphical user interface, or by any other suitable input monitoring method and system.

It will be understood that the visual representations produced by the herein described system are specifically adapted to enable the visual representation of complex data in order to convey useful information while minimizing the use of production printing materials or limiting the space in which the information may be conveyed. That is, by enabling the herein described system to produce a visual representation that has one or more characteristics as described to summarize a complex problem or complex data, a number of technical advantages are immediately provided.

For example, the characteristics of the visual representation may include the limitation of the size of the visual representation, the use of a minimum amount of ink, or the creation of the representation using a minimal or bounded area space or minimum amount of time. These characteristics then may solve one or more problems such as the excessive consumption of consumable items by reducing the required consumption of consumables such as paper and ink resources, as well as reducing the energy required to produce the printouts of the visual representations or the displaying of the information on a display module due to the ability to provide the required information in a visual space of a smaller size.

Therefore, the data visualization techniques described herein transform the raw data received into a unique visualization that enables further or hidden information within the raw data to be visually represented in a manner that conveys the information to a user in an efficient manner.

Figure 11:
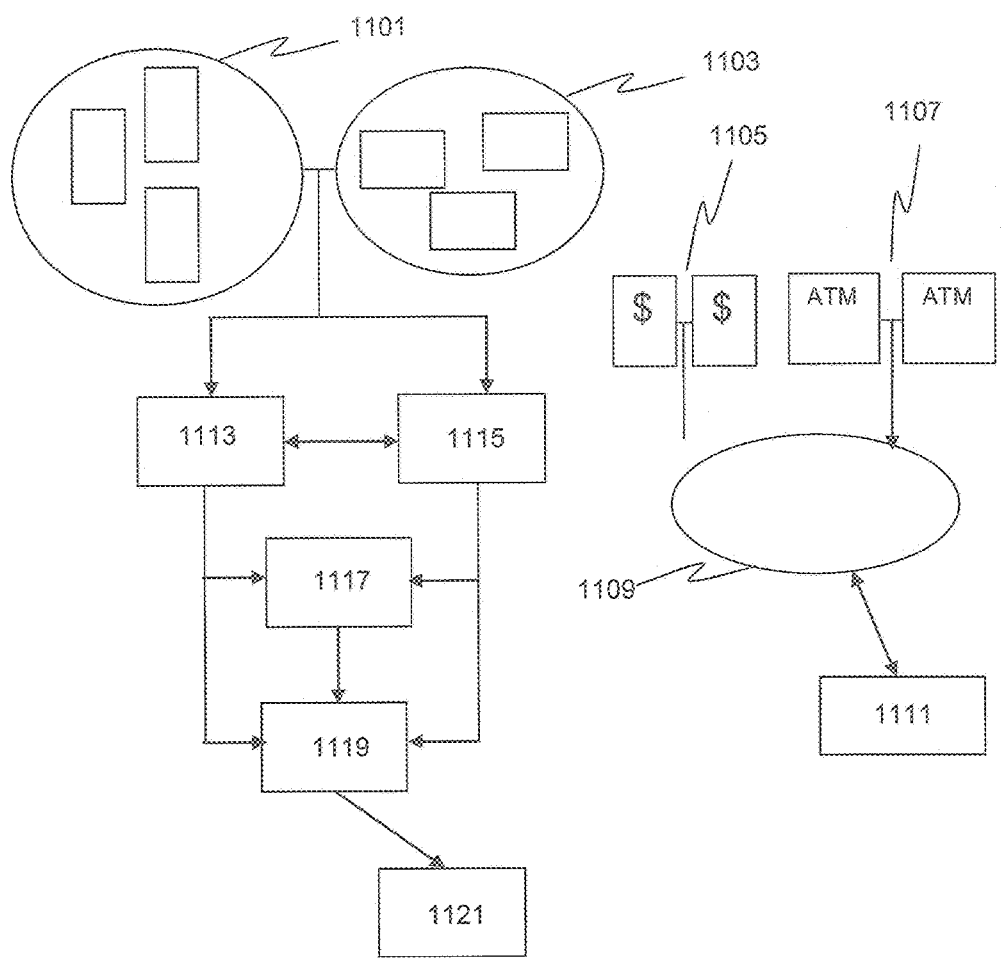
FIG. 11 shows how embodiments of the present invention may be incorporated within a gaming environment.

FIG. 11 shows an example of how the herein described system may be incorporated within a gaming environment. The gaming environment consists of a number of gaming machines 1101 and electronic tables 1103 (among other electronic gaming devices) that are adapted to communicate electronically with other systems using any suitable protocols, such as data packet protocols.

The gaming environment further includes a number of electronic cashier devices 1105 and ATMs 1107 which are in communication via a Wide Area Network 1109 with one or more financial databases 1111.

Data from the gaming machines 1101 and electronic tables 1103 are transferred to a reward program database 1113 and customer database 1115. It will be understood that these two databases may be combined into a single database.

Data from the cashier devices are also transferred to the reward program database 1113 and customer database 1115. The databases 1113 and 1115 are in communication with a central hotel management system 1117 that oversees the operation of the gaming environment, including the activities of customers in other areas of a casino, such as shops, hotels, spas etc.

The system 1119 described herein is in communication with the reward program database 1113, customer database 1115 and central hotel management system 1117 so the system can retrieve all necessary data about the activities within the gaming environment. The various embodiments as described herein are employed by the system 1119 to provide an output 1121.

It will be understood that the embodiments of the present invention described herein are by way of example only, and that various changes and modifications may be made without departing from the scope of invention.

GLOSSARY

| Term | Definition |
| --- | --- |
| Agile Development | Agile software development is a conceptual framework for software engineering that promotes development iterations throughout the life-cycle of the project. There are many agile development methods; most minimize risk by developing software in short amounts of time. Software developed during one unit of time is referred to as an iteration, which may last from one to four weeks. Each iteration is an entire software project: including planning, requirements analysis, design, coding, testing, and documentation. An iteration may not add enough functionality to warrant releasing the product to market but the goal is to have an available release (without bugs) at the end of each iteration. At the end of each iteration, the team re-evaluates project priorities. Wikipedia[viii] |
| BPD Packages | A BPD Package is made up from a set of related BPDs. This relationship (between a BPD Package and its BPDs) is defined using metadata. BPD Packages can be thought of as the Visual Document's vocabulary. |
| Catalog | The described catalog is used to store permanent and temporary objects that are necessary for creation and storage of Visual Documents. These may include Visual Designs, BPDs, Configuration tools and other objects. There may be multiple catalogs of different types (such as- database, flat file) which are configured by an integrator- dependent on customer requirements. All items in a catalog are identified by a unique ID and can only be accessed by those with the correct authorization. |
| Data Packages | Data Packages contain data that can be sold with subscription or service provision including an associated managed dataset. For example, census data will be available as a Data Package; this Data Package will enable the described solution users to interact and use a slowly changing dataset called census. (Census data can be updated after each census and is often modeled between each census). |
| Dimension | Dimensional modeling always uses the concepts of facts (sometimes referred to as measures) and dimensions. Facts are typically (but not always) numeric values that can be aggregated, and dimensions are groups of hierarchies and descriptors that define the facts. For example, sales amount is a fact; timestamp, product, register#, store#, etc. are elements of dimensions. Wikipedia[ix] |
| Dimensional Modeling | DM is a logical design technique that seeks to present the data in a standard, intuitive framework that allows for high-performance access. It is inherently dimensional, and it adheres to a discipline that uses the relational model with some important restrictions. Every dimensional model is composed of one table with a multipart key, called the fact (sometimes referred to as measures) table, and a set of smaller tables called dimension tables. Each dimension table has a single-part primary key that corresponds exactly to one of the components of the multipart key in the fact table. Intelligent Enterprise[x] |
| Enterprise Java Beans (EJBs) | In a typical J2EE application, Enterprise JavaBeans (EJBs) contain the application's business logic and live business data. Although it is possible to use standard Java objects to contain your business logic and business data, using EJBs addresses many of the issues you would find by using simple Java objects, such as scalability, lifecycle management, and state management. Wikipedia[xi] |
| Fact | Dimensional modeling always uses the concepts of facts (sometimes referred to as measures) and dimensions. Facts are typically (but not always) numeric values that can be aggregated, and dimensions are groups of hierarchies and descriptors that define the facts. For example, sales amount is a fact; timestamp, product, register#, store#, etc. are elements of dimensions. Wikipedia[xii] |

| Term | Definition |
| --- | --- |
| IIOP (Internet Inter-ORB Protocol) | IIOP (Internet Inter-ORB Protocol) is a protocol that makes it possible for distributed programs written in different programming languages to communicate over the Internet. SearchCIO-Midmarket[xiii] |
| KML | Keyhole Markup Language.<br>Google ™ Earth is a geographic browser-a powerful tool for viewing, creating and sharing interactive files containing highly visual location-specific information. These files are called KMLs (for Keyhole Markup Language): what HTML is to regular Internet browsers, KML is to geographic browsers. You can open KML files in both Google ™ Earth and Google ™ Maps, as well as in many other geographic browsers. Google ™ Maps[xiv] |
| MDT | The average time that a system is non-operational. This includes all time associated with repair, corrective and preventive maintenance; self imposed downtime, and any logistics or administrative delays. The difference between MDT and MTTR (mean time to repair) is that MDT includes any and all delays involved; MTTR looks solely at repair time. Wikipedia[xv] |
| Metadata | Metadata describes how data is queried, filtered, analyzed, and displayed in the described solution. In general terms, metadata is data about data. For example, in a library the metadata (pertaining to the catalog of books) could be-the title of the book, the author(s), categories (e.g. reference, fiction, non-fiction etc), physical location. This metadata can be used in searches, directories etc to help users locate books. |
| MTBF | Mean time between failures (MTBF) is the mean (average) time between failures of a system, and is often attributed to the 'useful life' of the device i.e. not including 'infant mortality' or 'end of life'. Calculations of MTBF assume that a system is 'renewed', i.e. fixed, after each failure, and then returned to service immediately after failure. The average time between failing and being returned to service is termed mean down time (MDT) or mean time to repair (MTTR).<br>MTBF = (downtime − uptime)/number of failures. Wikipedia[xvi] |
| MTTR | Mean Time to Recovery-the average time that a device will take to recover from a non-terminal failure. Examples of such devices range from self-resetting fuses (where the MTTR would be very short, probably seconds), up to whole systems which have to be replaced. The MTTR would usually be part of a maintenance contract, where the user would pay more for a system whose MTTR was 24 hours, than for one of say, 7 days. This does not mean the supplier is guaranteeing to have the system up and running again within 24 hours (or 7 days) of being notified of the failure. It does mean the average repair time will tend towards 24 hours (or 7 days). A more useful maintenance contract measure is the maximum time to recovery which can be easily measured and the supplier held accountable. Wikipedia[xvii] |
| OLAP | On Line Analytical Processing.<br>OLAP performs multidimensional analysis of business data and provides the capability for complex calculations, trend analysis, and sophisticated data modeling.<br>OLAP enables end-users to perform ad hoc analysis of data in multiple dimensions, thereby providing the insight and understanding the need for better decision making. Paris ™ Technologies[xviii] |
| Planogram | A planogram is a diagram of fixtures and products that illustrates how and where retail products should be displayed, usually on a store shelf in order to increase customer purchases. They may also be referred to as planograms, plan-o-grams, schematics (archaic) or POGs.<br>A planogram is often received before a product reaches a store, and is useful when a retailer wants multiple store displays to have the same look and feel. Often a consumer packaged goods manufacturer will release a new suggested planogram with their new product, to show how it relates to existing products in said category.<br>Planograms are used nowadays in all kind of retail areas.<br>A planogram defines which product is placed in which area of a shelving unit and with which quantity. The rules and theories for the creation of a planogram are set under the term of merchandising. Wikipedia[xix] |
| Request Queue | The Request Queue manages Visual Documents requests generated by a user or the scheduler.<br>As requests are processed, the Visual Document maintains various statuses until the Visual Document is complete and available to be viewed by a user. |
| SaaS | Software as a Service.<br>A software application delivery model where a software vendor develops a web-native software application and hosts and operates (either independently or through a third-party) the application for use by its customers over the Internet. Customers do not pay for owning the software itself but rather for using it. Wikipedia[xx] |
| Scrum | Scrum is an agile process that can be used to manage and control software development.<br>With Scrum, projects progress via a series of iterations called sprints. These iterations could be as short as 1 week or as long as 1 month.<br>Scrum is ideally suited for projects with rapidly changing or highly emergent requirements. The work to be done on a Scrum project is listed in the Product Backlog, which is a list of all desired changes to the product. At the start of each sprint a Sprint Planning Meeting is held during which the Product Owner prioritizes the Product Backlog and the Scrum Team selects the tasks they can complete during the coming Sprint. These tasks are then moved from the Product Backlog to the Sprint Backlog.<br>Each day during the sprint a brief daily meeting is held called the Daily Scrum, which helps the team stay on track.<br>At the end of each sprint the team demonstrates the completed functionality at a Sprint Review Meeting. |
| Self Organizing Maps (SOM) | A type of artificial neural network that is trained using unsupervised learning to produce a low-dimensional (typically two dimensional), representation of the input space of the training samples, called a map. The map seeks to preserve the topological properties of the input space. Wikipedia[xxi] |
| Servlets | Servlets are modules of Java code that run in a server application (hence the name "Servlets", similar to "Applets" on the client side) to answer client requests. Servlets are not tied to a specific client-server protocol but they are most commonly used with HTTP and the word "Servlet" is often used in the meaning of "HTTP Servlet".<br>Servlets make use of the Java standard extension classes. Since Servlets are written in the highly portable Java language and follow a standard framework, they provide a means to create sophisticated server extensions in a server and operating system independent way.<br>Typical uses for HTTP Servlets include:<br>1. Processing and/or storing data submitted by an HTML form.<br>2. Providing dynamic content, e.g. returning the results of a database query to the client.<br>3. Managing state information on top of the stateless HTTP, e.g. for an online shopping cart system which manages shopping carts for many concurrent customers and maps every request to the right customer.<br>Servlet Essentials[xxii] |
| Subject Matter Expert (SME) | The Subject Matter Expert is that individual who exhibits the highest level of expertise in performing a specialized job, task, or skill within the organization. Six Sigma[xxiii] |
| WebSphere | WebSphere is an IBM ™ brand of products that implement and extend Sun's JavaTwoEnterpriseEdition (J2EE) platform. The Java-based application and transaction infrastructure delivers high-volume transaction processing for e-business and provides enhanced capabilities for transaction management, as well as security, performance, availability, connectivity, and scalability. IBM ™ WebSphere Product Pages[xxiv] |

References in relation to the above described methods include:
1. A. Inselberg and B. Dimsdale, "Parallel Coordinates: A Tool for Visualizing Multidimensional Geometry," Proc. IEEE Visualization 1990, IEEE Computer Society Press, San Francisco, Calif., USA, Oct. 23-25, 1990, pp. 361-378;
2. http://en.wikipedia.org/wiki/Principal_components_analysis.
3. Pearson, K., Principal Components Analysis, *The London, Edinburgh and Dublin Philosophical Magazine and Journal*, p. 566, Volume 6, Issue 2 (1901).

[i] Wikipedia; "Heat map"; Date Accessed, Jun. 10, 2008; http://en.wikipedia.org/wiki/Heat_map

[ii] Nasdaq; Nasdaq-100 Dynamic Heatmap; Date Accessed, Jun. 10, 2008; http://screening.nasdaq.com/heatmaps/heatmap_100.asp

[iii] Weather.com; Date Accessed, Jan. 31, 2008; http://weather.com/.

[iv] Information Aesthetics; Information Aesthetics; "travel time maps"; Date Accessed, Jan. 31, 2008; http://infosthetics.com/archives/locative/

[v] Few, Stephen—from white paper "BizViz: The Power of Visual Business Intelligence"—Mar. 7, 2006. www.perceptualedge.com

[vi] Wikipedia; Wikipedia; "Voronoi Diagram"; Date Accessed, Jan. 31, 2008; http://en.wikipedia.org/wiki/Voronoi_diagram.

[vii] ENTROPÍA; ENTROPÍA; "Más tiempo"; Date Accessed, Jan. 31, 2008; http://www.luispabon.com/entropia/index.php?entry=entry071129-145959.

[viii] Wikipedia; Wikipedia; "Agile Software Development"; Date Accessed, Jan. 30, 2008; http://en.wikipedia.org/wiki/Agile_software_development

[ix] Wikipedia; Wikipedia: "Dimensional Modeling"; Date Accessed: Apr. 10, 2008; http://en.wikipedia.org/wiki/Dimensional_modeling

[x] Kimball, Ralph, A Dimensional Modeling Manifesto; Date Accessed: Apr. 10, 2008; http:www.dbmsmag.com/9708d15.html

[xi] Sam's Publishing; developer.com Gamelan™; "Introduction to EJB's"; http://www.developer.com/java/ejb/article.php/1434371.

[xii] Wikipedia; Wikipedia: "Dimensional Modeling"; Date Accessed: Apr. 10, 2008; http://en.wikipedia.org/wiki/Dimensional_modeling

[xiii] Gilbert, Cheryl, et. al.; SearchCIO—Midmarket; "IIOP"; date Accessed, Jan. 30, 2008; http://searchcio-midmarket.techtarget.com/sDefinition/0.sid183_gci214019.00.html.

[xiv] Google; Google Maps; "KML Gallery: Explore the Earth on Google"; Date Accessed, Jan. 30, 2008; http://earth.google.com/gallery/

[xv] Wikipedia; Wikipedia; "Mean down time"; Date Accessed, Jan. 30, 2008; http://en.wikipedia.org/wiki/Mean_down_time.

[xvi] Wikipedia; Wikipedia; "Mean time between failures"; Date Accessed, Jan. 30, 2008; http://en.wikipedia.org/wiki/Mean_time_between_failures.

[xvii] Wikipedia; Wikipedia; "Mean time to recovery"; Date Accessed, Jan. 30, 2008; http://en.wikipedia.org/wiki/Mean_time_to_recovery.

[xviii] Paris Technologies, Inc.; Paris Technologies; "OLAP"; Date Accessed, Jan. 30, 2008; http://www.olap.com.

[xix] Wikipedia; Wikipedia; "Planogram"; Date Accessed, Jan. 30, 2008; http://en.wikipedia.org/wiki/Planogram.

[xx] Wikipedia; Wikipedia; "Software as a Service"; Date Accessed, Jan. 30, 2008; http://en.wikipedia.org/Software_as_a_Service.

[xxi] Wikipedia; Wikipedia; "Self-organizing map"; Date Accessed, Jan. 30, 2008; http://en.wikipedia.org/wiki/Self-organizing_map.

[xxii] Zeiger, Stefan, Servlet Essentials, Version 1.3.6-Nov. 4, 1999; Date Accessed, Jan. 30, 2008

[xxiii] Six Sigma; Subject Matter Expert—SME; Date Accessed: Jan. 30, 2008; http://www.isixsigma.com/dictionary/Subject_Matter_Expert_-_SME-396.htm

[xxiv] IBM; WebSphere Product Pages; "WebSphere software"; Date Accessed: Jan. 30, 2008; http://www-306.ibm.com/software/websphere/?pgel=ibmhzn&cm_re-masthead-_-products-_-sw-websphere.

I claim:

1. In a data visualization computer system, a method of arranging in a visual representation in n dimensions, data points representing n or more variables, the method including the steps of:
   i. a data point ranking module on the data visualization computer system, ranking a set of data points with respect to a first axis of the visual representation in n dimensions using a first variable;
   ii. based on a second variable, a data point distribution module on the data visualization computer system, distributing the set of data points along the first axis of the visual representation in n dimensions while retaining information relating to the ranking of data points determined in step i);
   iii. based on a third variable, the data point ranking module on the data visualization computer system, ranking a set of data points with respect to a second axes of the visual representation in n dimensions; and
   iv. based on the third variable, the data point distribution module on the data visualization computer system, distributing the set of data points along the second axis of the visual representation in n dimensions while retaining information relating to the ranking of data points determined in step iii).

2. The method as claimed in claim 1, wherein the data points represent n+1 or more variables.

3. The method as claimed in claim 1, further including the steps of:
   v. the data point ranking module on the data visualization computer system, ranking data points with respect to one or more further axes using one or more variables; and
   vi. the data point distribution module on the data visualization computer system, distributing data points along the further axes while retaining information relating to the ranking of data points determined in step v).

4. The method as claimed in claim 1, wherein a maximum value on each axis is defined by data values for a particular variable.

5. The method as claimed in claim 4, wherein the maximum value on each axis is defined by the sum of data values over a particular variable.

6. The method as claimed in claim 1, including the step of visually representing at least a subset of the arranged data points.

7. The method as claimed in claim 6, further including the step of visually representing supplementary information over the displayed arranged data points.

8. The method as claimed in claim 7, further including the step of visually representing the supplementary information in the form of a contour or heat map.

9. The method as claimed in claim 1, wherein the step of distributing the data points includes the step of dividing the data points between two or more regions in the visual representation.

10. The method as claimed in claim 9, wherein the regions are n-dimensional regions.

11. The method as claimed in claim 9, wherein the regions are arranged within the visual representation to convey information that is based on proportions of summed variables contained within the regions.

12. The method as claimed in claim 9, further including the steps of distributing data points within a region of the visual representation, by creating two or more sub-regions within the region and distributing data points between those sub-regions.

13. The method as claimed in claim 12, further including the steps of dividing sub-regions of the visual representation and distributing data points within the divided sub-regions until at most a single data point is contained in each sub-region.

14. The method as claimed in claim 9 further including the step of visually representing supplementary information in one or more empty regions.

15. The method as claimed in claim 14, wherein the supplementary information is visually represented using a visual design.

16. The method as claimed in claim 1, further including the step of displaying data points so as to provide a complete view of information of interest.

17. The method as claimed in claim 1, further including the step of filtering data associated with the data points before displaying the data points.

18. The method as claimed in claim 1, further including the step of applying a dimension reduction technique to data associated with the data points before displaying the data points.

19. The method as claimed in claim 1, further including the step of selecting data associated with the data points for visual representation or selecting a view of arranged data points in order to maximize the visual representation of data or variables of interest associated with the data points.

20. The method as claimed in claim 1, wherein the step of distributing data points includes the step of determining a unique position for each data point along each axis of the visual representation.

21. The method of claim 1 further including the step of ranking the data points using a deterministic sorting function.

22. The method of claim 21 further including the step of ranking the data points based on at least one of volume, importance, statistical ordering, statistical distance, quantity, or value.

23. A data visualization computing system for arranging, in a visual representation in n dimensions, data points representing n or more variables, the data visualization computing system comprising:
   a processor device;
   a memory device;
   a data retrieval module arranged to retrieve data stored on the memory device from a data storage module, in communication with the data visualization computing system, wherein the retrieved data is associated with data points representing n or more variables;
   a data point ranking module executable by the processor arranged to rank a set of data points with respect to a first axis of the visual representation in n dimensions using a first variable;
   based on a second variable, a data point distribution module executable by the processor arranged to distribute the set of data points along the first axis of the visual representation in n dimensions while retaining information relating to the ranking of data points with respect to the first axis as determined by the data point ranking module;
   based on a third variable, the data point ranking module ranking a set of data points with respect to a second axes of the visual representation in n dimensions; and
   based on a the third variable, the data point distribution module distributing the set of data points along the second axis while retaining information relating to the ranking of data points with respect to the second axes of the visual representation in n dimensions as determined by the data point ranking module.

24. The system of claim 23 wherein the data point ranking module is further arranged to rank data points with respect to one or more further axes using one or more variables; and the data point distribution module is further arranged to distribute data points along the further axes while retaining information relating to the ranking of data points determined by the data point ranking module.

* * * * *